(12) United States Patent
Perotti et al.

(10) Patent No.: US 10,148,481 B2
(45) Date of Patent: Dec. 4, 2018

(54) METHOD AND APPARATUS FOR DATA TRANSMISSION IN A MULTIUSER DOWNLINK CELLULAR SYSTEM

(71) Applicant: Huawei Technologies Co., Ltd., Shenzhen (CN)

(72) Inventors: Alberto Giuseppe Perotti, Segrate (IT); Pablo Soldati, Kista (SE); Branislav M. Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 15/277,771

(22) Filed: Sep. 27, 2016

(65) Prior Publication Data
US 2017/0041178 A1 Feb. 9, 2017

Related U.S. Application Data

(63) Continuation of application No. PCT/EP2015/051934, filed on Jan. 30, 2015.

(30) Foreign Application Priority Data

Mar. 28, 2014 (WO) ................. PCT/EP2014/056365

(51) Int. Cl.
*H04L 27/34* (2006.01)
*H04L 1/00* (2006.01)
(Continued)

(52) U.S. Cl.
CPC ....... *H04L 27/3461* (2013.01); *H04B 17/336* (2015.01); *H04L 1/0042* (2013.01);
(Continued)

(58) Field of Classification Search
CPC . H04L 27/3461; H04L 5/0057; H04L 1/0042; H04L 27/3488; H04B 17/336; H04W 72/02; H04W 28/06; H04W 28/18
See application file for complete search history.

(56) References Cited

U.S. PATENT DOCUMENTS 8,559,371 B2 * 10/2013 Wu ........................... H04L 5/02
370/328
8,774,303 B2 * 7/2014 Eom .................... H04B 7/0469
342/175
(Continued)

FOREIGN PATENT DOCUMENTS

EP 2299737 A1 3/2011
EP 2326053 A1 5/2011
(Continued)

OTHER PUBLICATIONS

Perotti et al., "Non-Orthogonal Multiple Access for Degraded Broadcast Channels: RA-CEMA," (2014).
(Continued)

*Primary Examiner* — Ivan O Latorre
(74) *Attorney, Agent, or Firm* — Leydig, Voit & Mayer, Ltd.

(57) ABSTRACT

A data transmission and signaling method in a transmitter device configured for concurrent transmission of non-orthogonal independent downlink data streams to receiver devices in a wireless communication system comprises sending to all receiver devices control information that includes indices of receiver devices selected for transmission, code rates of selected receiver devices, a label bit-to-receiver device allocation, an index of an expanded constellation, and a number of resource elements used for transmission.

14 Claims, 13 Drawing Sheets

(51) Int. Cl.
  *H04W 72/02* (2009.01)
  *H04B 17/336* (2015.01)
  *H04L 5/00* (2006.01)
  *H04W 28/06* (2009.01)
  *H04W 28/18* (2009.01)

(52) U.S. Cl.
  CPC ........ *H04L 5/0057* (2013.01); *H04L 27/3488* (2013.01); *H04W 72/02* (2013.01); *H04W 28/06* (2013.01); *H04W 28/18* (2013.01)

(56) References Cited

U.S. PATENT DOCUMENTS

| | | | |
|---|---|---|---|
| 9,407,343 B2* | 8/2016 | Krishnamurthy | H04J 11/0053 |
| 2003/0048856 A1* | 3/2003 | Ketchum | H04L 1/0009 |
| | | | 375/260 |
| 2008/0037464 A1* | 2/2008 | Lim | H04W 72/085 |
| | | | 370/329 |
| 2010/0254331 A1* | 10/2010 | Kim | H04L 1/0026 |
| | | | 370/329 |
| 2010/0284443 A1* | 11/2010 | Rosenqvist | H04L 25/0202 |
| | | | 375/147 |
| 2011/0002285 A1* | 1/2011 | Kim | H04L 5/0007 |
| | | | 370/329 |
| 2011/0142143 A1* | 6/2011 | Wu | H04L 27/0008 |
| | | | 375/259 |
| 2012/0155354 A1* | 6/2012 | Kishigami | H04B 7/0452 |
| | | | 370/311 |
| 2012/0182895 A1* | 7/2012 | Jwa | H04W 72/046 |
| | | | 370/252 |
| 2013/0114563 A1* | 5/2013 | Oizumi | H04L 5/001 |
| | | | 370/329 |
| 2013/0170571 A1* | 7/2013 | Barsoum | A61B 6/12 |
| | | | 375/262 |
| 2014/0056372 A1* | 2/2014 | Nammi | H04L 1/0029 |
| | | | 375/260 |
| 2015/0236812 A1* | 8/2015 | Barsoum | H04L 1/0003 |
| | | | 375/261 |
| 2015/0349997 A1* | 12/2015 | Baek | H04L 27/2637 |
| | | | 375/262 |
| 2016/0337067 A1* | 11/2016 | Yokomakura | H04B 7/00 |

FOREIGN PATENT DOCUMENTS

| | | |
|---|---|---|
| WO | WO 2015062659 A1 | 5/2015 |
| WO | WO 2015144250 A1 | 10/2015 |

OTHER PUBLICATIONS

Hossain et al., "Rate Adaptive Hierarchical Modulation-Assisted Two-User Opportunistic Scheduling," IEEE Transactions on Wireless Communications, vol. 6, No. 6, pp. 2076-2085, Institute of Electrical and Engineers, New York, New York (Jun. 2007).

Song et al., "Approaching Capacity Region for Two-user GBC with Bit Division Multiplexing," IEEE Transactions on Vehicular Technology, pp. 1-7, Institute of Electrical and Electronics Engineers (2013).

Cover et al., "Elements of Information Theory," Second Edition, Wiley-Interscience Publications, John Wiley & Sons inc, Hoboken, New Jersey (2006).

* cited by examiner

METHOD AND APPARATUS FOR DATA TRANSMISSION IN A MULTIUSER DOWNLINK CELLULAR SYSTEM

CROSS-REFERENCE TO RELATED APPLICATIONS

This application is a continuation of International Application No. PCT/EP2015/051934, filed on Jan. 30, 2015, which claims priority to International Application No. PCT/EP2014/056365, filed on Mar. 28, 2014. The disclosures of the aforementioned applications are hereby incorporated by reference in their entireties.

TECHNICAL FIELD

The aspects of the present disclosure relate generally to wireless communication systems and in particular to concurrent transmission of downlink data streams in a multiuser system.

BACKGROUND

The proliferation of modern wireless communications devices, such as cell phones, smart phones, and tablet devices, has seen an attendant rise in demand for large multimedia data capabilities for large populations of user equipment (UE) or mobile stations. These multimedia data can include streaming radio, online gaming, music, and TV at the receiver device. To support this ever increasing demand for higher data rates, multiple-access networks are being deployed based on a variety of transmission techniques such as time division multiple access (TDMA), code division multiple access (CDMA), frequency division multiple access (FDMA), orthogonal frequency division multiple access (OFDMA), and single carrier FDMA (SC_FDMA). New standards for wireless networks are also being developed. Examples of these newer standards include Long Term Evolution (LTE) and LTE-Advanced (LTE-A) being developed by the third generation partnership project (3GPP), the 802.11 and 802.16 family of wireless broadband standards maintained by the Institute of Electric and Electronic Engineers (IEEE), WiMAX, an implementation of the IEEE 802.11 standard from the WiMAX Forum, as well as others. Networks based on these standards provide multiple-access to support multiple simultaneous users by sharing available network resources.

Wireless communication networks such as a heterogeneous network include multiple base stations to support downlink and uplink communications with multiple receiver devices, also referred to herein as user equipment (UE). Information sent from a receiver device to a base station is referred to as uplink communication (UL), and information sent from a base station to a receiver device is referred to as a downlink (DL) communication.

In the downlink of cellular wireless systems, a single transmitter sends several coded and modulated data streams—each consisting of a sequence of coded information words, or code words—to multiple user equipment receivers over a shared physical channel. The physical channel consists of a set of distinct time-frequency-space Resource Elements (RE). A resource element is the smallest useable portion of the radio spectrum consisting of one sub-carrier during one symbol period and has dimensions of frequency and time. In each RE, a complex symbol drawn from a certain set of available symbols called a constellation is transmitted.

When the transmitter is simultaneously serving multiple receiver devices, REs are typically divided in blocks, called Resource Blocks (RB). Different resource blocks are typically assigned to different receiver devices in such a way that in each RB only one receiver device is allowed to perform transmission. In this case, signals intended for different receiver devices are constrained to be mutually orthogonal in order to avoid inter-receiver device interference. The resulting orthogonal Multiple Access (MA) schemes are widely adopted in current standards. However, it is well known that increased rates (compared to orthogonal transmission) can be achieved for all multiplexed receiver devices if these receiver devices experience sufficiently different signal-to-noise ratios (SNR). In this case, a full exploitation of the multiuser channel capacity cannot be achieved by means of orthogonal MA schemes.

To obtain higher data rates, it is necessary to perform concurrent transmission to multiple receiver devices on the available REs. This can be accomplished, by employing suitably designed non-orthogonal MA (NOMA) schemes like, for example, superposition coding (SC). Alternatively, one could use other schemes not based on linear superposition coding like the overloaded multiple access (OLMA) schemes based on codeword-level multiplexing. Examples of these include Constellation Expansion Multiple Access (CEMA) and Rate-Adaptive Constellation Expansion Multiple Access (RA-CEMA).

RA-CEMA has been proposed as a solution for non-orthogonal transmission capable of achieving the same data rates as SC while featuring lower complexity and increased flexibility. FIG. 18 illustrates one example of an exemplary RA-CEMA system 20 in a LTE wireless communication system with an RA-CEMA transmitter 10 and two receiver devices 50. The "Channel coding and rate matching" block 12 receives a message of information bits $b_u=(b_u(1), \ldots, b_u(K_u))$ from user u and generates a vector of coded bits $e_u=(e_u(1), \ldots, e_u(E_u))$. The rate-adaptive code-words multiplexer 13 collects the code words $e_0, \ldots, e_{U-1}$ and generates a vector of symbol labels $l=(l(1), \ldots, l(G))$. After G m-bit labels $l=(l(1), \ldots, l(G))$ have been generated by the code-words multiplexer 13, the modulator block 14 in FIG. 18 generates a sequence of G complex modulation symbols $x(x(1), \ldots, x(G))$ drawn from the expanded constellation $\chi_{EXP}$. Finally, the complex symbol vector x is transmitted by means of the transmitter unit 15 using G REs in the communication system 20.

In the example shown in FIG. 18, the multiplexing matrix is selected from a library 16, 54 of pre-designed matrices available at the transmitter device 10 and at the receiver devices 50, respectively. Each matrix corresponds to one out of multiple possible trade-offs between e.g. near-user rate and far-user rate. The matrix to be used for transmission is selected by the transmitter as a function of the rates, of the expanded constellation order m and of the number of REs G computed by the scheduler 11 as described above.

The RA-CEMA scheduler 11 of FIG. 18 performs receiver device selection and transmission parameter computation. The receiver device selection is performed taking into account the single-user channel quality (CQ) and service fairness criteria. However, the algorithm associated with the receiver device selection operates prior to and independently of the employed code word multiplexing scheme. Such receiver device selection and transmission parameter computation can result in lower data rates and, ultimately, in a lower throughput.

It would be advantageous to perform user selection jointly with the computation of transmission and multiplexing parameters to obtain increased throughput.

Also, RA-CEMA implementations need a specific multiplexing matrix for each number of receiver devices, receiver devices' SNR values and receiver device rates. Therefore, for each combination of number of receiver devices, receiver device rates and set of SNR values, a specific multiplexing matrix must be designed ad-hoc. Clearly, in systems of practical interest, the number of designed matrices is very large. As a result, the size of the data structure used to store such multiplexing matrices (also referred to as Multiplexing Matrix Library) may become very large. Since all the designed matrices must be made available at the transmitter 10 and the receivers 50 as is illustrated in FIG. 18, the large size of the library results in a large memory footprint both for the transmitter 10 and receivers 50. A correspondingly large signaling overhead is required to indicate to receivers 50 which matrix has been selected from the library for transmission in each transmission time interval (TTI). It would be advantageous to provide a general multiplexing matrix design for an arbitrary number of receiver devices characterized by arbitrary SNR values and arbitrary rates that reduces the size of the required data structures and signaling overhead.

Another drawback of RA-CEMA implementations is that modulation and coding scheme (MCS) parameter computation and MCS optimization are performed sequentially. The MCS parameters are computed independently for each selected receiver device without taking into account any scheduling metric. This approach does not allow exploitation of the full potential of non-orthogonal transmission. It would be advantageous to provide a scheme in which MCS parameter computation and MCS optimization are performed jointly by taking into account in this computation also the scheduling strategy.

Thus, there is a need for improved methods and apparatus for concurrent transmission of downlink data streams in wireless communication networks.

SUMMARY

It is an object of the present disclosure to provide methods and apparatus for concurrent transmission of downlink data streams in wireless communication networks. A further object of the present disclosure is to provide increased down-link throughput for a wireless communication system.

According to a first aspect of the present disclosure the above and further objects and advantages are obtained by a transmitter device for transmitting wireless communication signals in a wireless communication or cellular network. The transmitter device includes a processor configured to determine a downlink channel quality of downlink channels between the transmitter and a plurality of receiver devices, compute a scheduler weight for each of the plurality of receiver devices, for each modulation of a set of modulations, determine weighted bit-level capacities of all label bits based on the scheduler weights and based on the downlink channel qualities, determine, for each modulation, a highest weighted sum rate based on the weighted bit-level capacities, select a modulation from the set of modulations according to a maximum weighted sum rate among the highest weighted sum rates, select a set of receiver devices from the plurality of receiver devices according to the selected modulation, and select a label bit allocation for receiver devices in the selected set of receiver devices according to the selected modulation. A multiplexing matrix is obtained using the selected label bit-to-UE allocation and the number of resource elements, which are for transmitting a downlink signal S. A a code rate is computed using the selected label bit-to-UE allocation and the determined bit-level capacity for each receiver device in the selected set. The transmitter device is configured to transmit, using the resource elements, the downlink signal S based on the obtained multiplexing matrix and computed code rates, to the receiver devices in the selected set. In one embodiment, the transmitter device used to transmit downlink signal S can include an RA-CEMA transmitter. Alternatively, the transmitter device can include any transmitter device that is configured to accept multiplexing matrices as part of its configuration parameters. This allows user equipment selection to be performed jointly with the computation of transmission and multiplexing parameters.

In a first possible implementation form of the transmitter device according to the first aspect all label bits having the same bit-level capacity are allocated to a same receiver device in the selected set of receiver devices. This implementation has the advantage of simplifying the transmission scheme by reducing the number of needed multiplexing matrices, while not resulting in performance degradation.

In a second possible implementation form of the transmitter device according to the first aspect as such or to the first possible implementation form of the first aspect the processor is configured to determine weighted bit-level capacities of all label bits for each modulation based on the determined channel quality of the downlink channels between the transmitter device and the plurality of receiver devices by using a CQI-to-bit level capacity table stored in a memory. This implementation has the advantage of enabling the scheduler to compute the weighted sum rate and hence to perform the best UE selection, label bit allocation and modulation selection.

In a third possible implementation form of the transmitter device according to the first aspect as such or to any of the preceding first or second possible implementation forms of the first aspect the processor is configured to receive the downlink channel qualities for the downlink channels of the plurality of receiver devices; or estimate the downlink channel qualities by measuring corresponding uplink channels for the plurality of receiver devices. This implementation has the advantage of making the transmitter device aware of the downlink channel qualities, which is needed for the correct computation of transmission parameters.

In a fourth possible implementation form of the transmitter device according to the first aspect as such or to any of the preceding first through third possible implementation forms of the first aspect the downlink channel qualities are based one or more of a signal-to-noise ratio or a signal-to-interference plus noise ratio. This implementation has the advantage of making easier the computation of channel qualities.

In a fifth possible implementation form of the transmitter device according to the fourth implementation form of the first aspect the processor is configured to encode for each of the receiver devices in the selected set of receiver devices an information word to obtain a code word; use the obtained multiplexing matrix to multiplex the code words into a label vector of G elements $l=(l(1), \ldots, l(G))$ according to the selected label bit-to-UE allocation; use each label of the label vector $l=(l(1), \ldots, l(G))$ to select a modulation symbol from the selected modulation to obtain a symbol vector $x=(x(1), \ldots, x(G))$ for the multiplexed code words; wherein the downlink signal S comprises the symbol vector $x=(x(1), \ldots, x(G))$. This implementation has the advantage of enabling concurrent transmission of several data streams with increased aggregate throughput.

In a sixth possible implementation form of the transmitter device according to the first aspect as such or to any of the preceding first through fifth possible implementation forms of the first aspect the processor is configured to signal to the receiver devices in the selected set of receiver devices an index of the multiplexing matrix stored in a pre-computed library of multiplexing matrices. Using an index of a multiplexing matrix reduces overhead since signaling an index requires fewer bits. This implementation also has the advantage of not requiring the computation of multiplexing matrices in each TTI.

In a seventh possible implementation form of the transmitter device according to the first aspect as such or to any one of the preceding first through sixth possible implementation form of the first aspect the multiplexing matrix is associated with at least two receiver devices from the selected set of receiver devices.

In an eighth possible implementation form of the transmitter device according to the first aspect as such or to any of the first through seventh possible implementation form of the first aspect the processor (502) is configured to transmit the downlink signal S with at least G number of time-frequency resource elements (RE). This implementation has the advantage of allowing the transmitter device to use the REs of any OFDMA transmission system.

In a ninth possible implementation form of the transmitter device according to the first aspect as such or to any of the preceding first through eighth possible implementation forms of the first aspect the processor is configured to transmit to the receiver devices in the selected set of receiver devices a downlink control information comprising at least one of a field indicating time-frequency resource allocation common to all receiver devices in the selected set; a field indicating a receiver device-specific code rate; a field indicating a selected multiplexing matrix common to all receiver devices in the selected set; and a field indicating a value in the selected multiplexing matrix to which a current receiver device from the selected set corresponds. This implementation has the advantage of allowing the receiver device to generate the multiplexing matrix.

In a tenth possible implementation form of the transmitter device according to the first aspect as such or to any of the preceding first through eight possible implementation forms of the first aspect the processor is configured to transmit to the receiver devices in the selected set a downlink control information comprising at least one of: a field indicating time-frequency resource allocation common to all receiver devices in the selected set; a field indicating a receiver device-specific code rate; a field indicating a selected modulation common to all receiver devices in the selected set; and a field indicating a receiver device-specific allocation of label bits. The parameters will allow the receiver device to generate the multiplexing matrix. This implementation has the advantage of reducing signaling overhead for enabling concurrent transmission.

According to a second aspect of the present disclosure the above and further objects and advantages are obtained by a method for concurrent transmission of non-orthogonal independent downlink data streams to receiver devices in a wireless communication system. In one embodiment, the method includes sending to the receiver devices control information comprising one or more of: identities of receiver devices selected for transmission; code rates of selected receiver devices; a label bit-to-receiver device allocation; an index of an expanded constellation; and the number of resource elements used for downlink transmission. This has the advantage of allowing user equipment selection to be performed jointly with the computation of transmission and multiplexing parameters.

In a first possible implementation form of the second aspect, the control information comprises one or more of a field indicating a time-frequency resource allocation common to all selected receiver devices; a field indicating a receiver device-specific code rate; a field indicating a selected multiplexing matrix common to all selected receiver devices; and a field indicating a value in the selected multiplexing matrix to which a current receiver device from the selected receiver devices corresponds. This implementation has the advantage of enabling configuration of concurrent downlink transmission to multiple user devices without signaling the modulation and label bit-to-receiver device allocation.

In a second possible implementation form of the second aspect, or the first possible implementation form of the second aspect, the control information comprises one or more of a field indicating time-frequency resource allocation common to all receiver devices; a field indicating a receiver device-specific code rate; a field indicating a modulation common to all selected receiver devices; and a field indicating a receiver device-specific allocation of label bits. This implementation has the advantage of enabling configuration of concurrent downlink transmission to multiple user devices without signaling an indication of the multiplexing matrix used at the transmitter device side.

According to a third aspect of the present disclosure the above and further objects and advantages are obtained by a receiver device. The receiver device comprises a processor configured to receive downlink control information indicating parameters used in a transmission of a downlink signal S; configure the receiver device according to the received downlink control information, receive the downlink signal S, demultiplex the downlink signal and decode the downlink signals according to the parameters received in the downlink control information. This has the advantage of providing increased downlink throughput in the wireless system in which the receiver device is employed.

According to a fourth aspect of the present disclosure the above and further objects and advantages are obtained by a computer program including non-transitory computer program instructions that when executed by a processor cause the processor to perform the method according to the second aspect as such or to the first and second possible implementation forms of the second aspect.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, the disclosure will be explained in more detail with reference to the example embodiments shown in the drawings, in which.

DETAILED DESCRIPTION OF THE DISCLOSED EMBODIMENTS

Embodiments of the disclosure herein disclosed relates to apparatus for concurrent transmission of multiple independent data streams intended for receiver devices with different experienced channel qualities. The apparatus can include transmitter and receiver devices. Embodiments of the present disclosure apply to the downlink of wireless communication systems, operating, for example, in Frequency Division Duplex (FDD) mode, Time Division Duplex (TDD) mode or other suitable wireless communication protocol.

Figure 1:
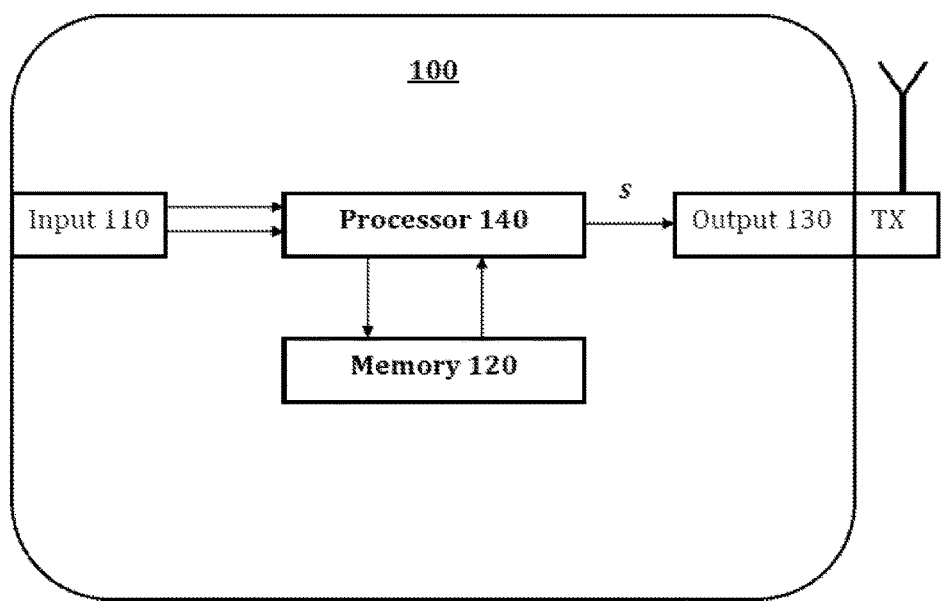
FIG. 1 illustrates a transmitter device according to an embodiment of the present disclosure.

FIG. 1 illustrates one embodiment of a transmitter device 100 incorporating aspects of the present disclosure. The transmitter device 100 includes an input unit 110 for receiving channel quality values or information from different receiver devices or users, also referred to as user equipment (UE). A memory 120 is configured to store general information such as a multiplexing matrix library and program instructions, for example. An output unit 130 is configured to transmit a downlink signal in a wireless communication system.

In one embodiment, the transmitter device 100 comprises at least one processor 140 configured to receive downlink channel quality information (CQI) from receiver devices; determine for each receiver device, and for each modulation of a set of modulations, the bit-level capacities of all the label bits of the modulation; compute the weighted sum rate (WSR) scheduler weights; determine, for each modulation, the maximum WSR and its corresponding label bit-to-UE allocation; select the modulation corresponding to the maximum WSR and compute the corresponding label bit-to-UE allocation, and in the same time or time interval, select a set of the receiver devices whose messages will be concurrently transmitted. This set of receiver devices includes all of the receiver devices having at least one bit allocated in the constellation label.

The processor 140 is further configured to use the selected label bit-to UE allocation to generate a corresponding multiplexing matrix and compute the receiver device codeword sizes.

The processor 140 is configured to use the selected label bit-to-UE allocation and the corresponding bit-level capacities to compute the receiver device code rates; and signal to the receiver devices the number of used REs, the order of the selected modulation, the label bit-to-UE allocation and the code rates.

Using the computed code word sizes and code rates the processor 140 is configured to independently encode for each receiver device an information message so as to obtain a codeword. Using the generated multiplexing matrix the processor 140 is configured to multiplex all the receiver device code words onto a vector of G labels; map the label vector to a vector of symbols drawn from the selected constellation to obtain a vector of G complex constellation symbols; and transmit the symbol vector in G time-frequency-space REs.

In one embodiment, the transmitter device is configured to transmit, using the resource elements, the downlink signal S based on the obtained multiplexing matrix and computed code rates, to the receiver devices in the selected set. The transmitter device can include an RA-CEMA transmitter. Alternatively, the transmitter can include any transmitter that is configured to accept multiplexing matrices as part of its configuration parameters.

Figure 2:
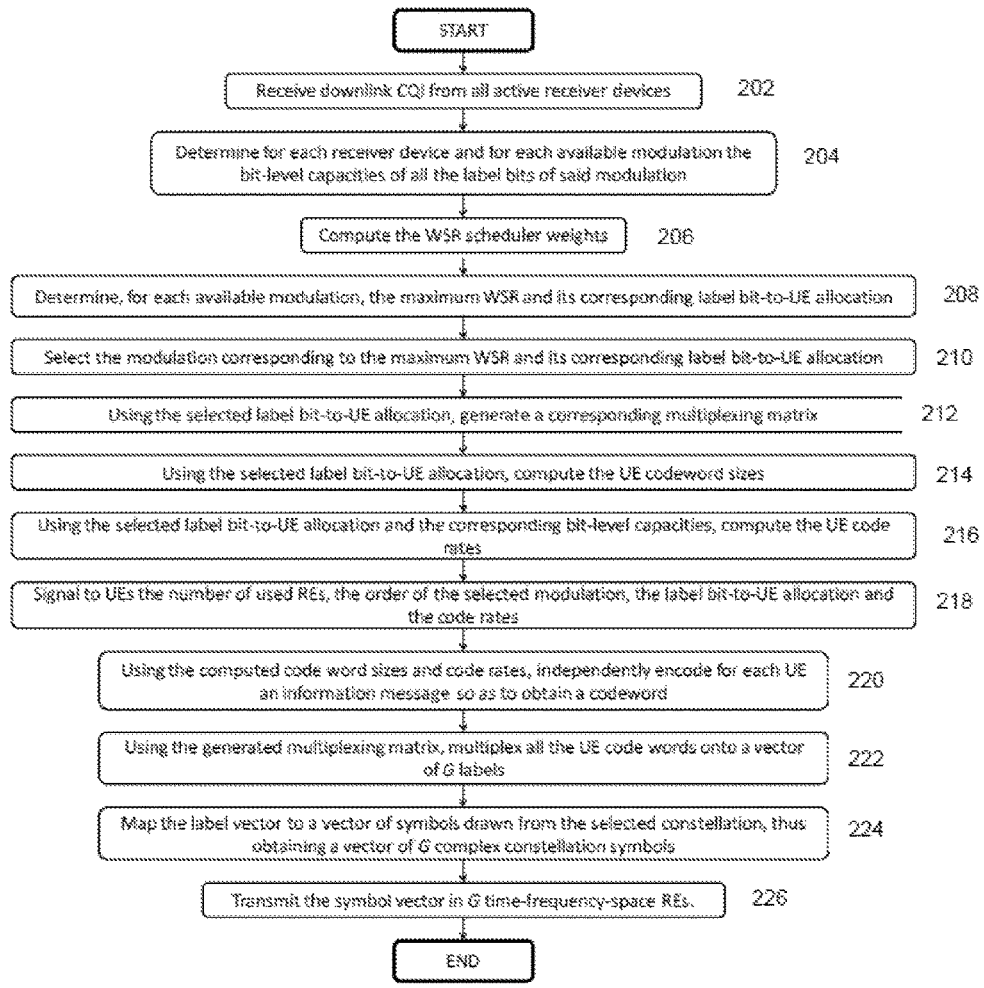
FIG. 2 is a flow chart illustrating an embodiment of the present disclosure.

FIG. 2 illustrates one embodiment of a transmission method that can be executed by the transmitter device 100 of FIG. 1. In one embodiment, the method includes:

receiving downlink CQI from receiver devices, in a step 202;

determining for the receiver devices from which downlink CQI is received and for each modulation in a set of modulations, the bit-level capacities of all the label bits of the modulation, in a step 204;

computing the weighted sum rate (WSR) scheduler weights, in a step 206;

determining, for each modulation, the maximum WSR and its corresponding label bit-to-UE allocation, in a step 208;

selecting the modulation corresponding to the maximum WSR and determining its corresponding label bit-to-UE allocation, including selecting a set of receiver devices from the receiver devices for transmission, the selected set including all receiver devices that obtain at least one bit in the constellation label, in a step 210;

using the determined label bit-to-UE allocation, generating a corresponding multiplexing matrix, in a step 212;

using the determined label bit-to-UE allocation, computing the receiver device codeword sizes, in a step 214;

using the selected label bit-to-UE allocation and the corresponding bit-level capacities, computing the receiver device code rates, in a step 216;

signalling to the receiver devices, the number of used REs, the order of the selected modulation, the determined label bit-to-UE allocation and the code rates, in a step 218;

using the computed code word sizes and code rates, independently encode for each receiver device in the set of receiver devices selected for transmission, an information message so as to obtain a codeword for each receiver device in the set, in a step 220;

using the generated multiplexing matrix, multiplex all the receiver device codewords into a vector of G labels, in a step 222;

mapping the label vector to a vector of symbols drawn from the selected constellation, thus obtaining a vector of G complex constellation symbols, in a step 224; and transmitting the symbol vector in G time-frequency-space REs to the receiver devices selected for transmission, in a step 226.

Figure 3:
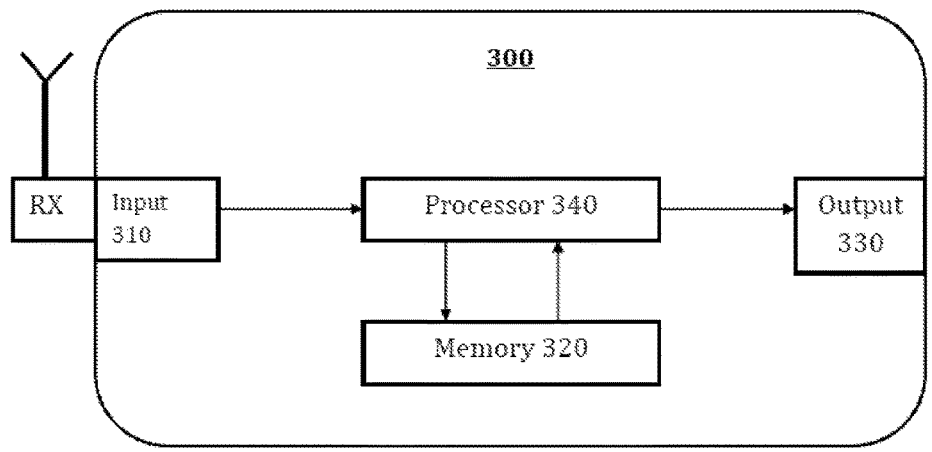
FIG. 3 illustrates a receiver device according to an embodiment of the present disclosure.

FIG. 3 illustrates one embodiment of a receiver device 300 incorporating aspects of the present disclosure. In one embodiment, the receiver device 300 includes an input unit 310 configured to receive a downlink signal, a memory 320 and an output unit 330. In one embodiment, the receiver device 300 includes at least one processor 340. The processor 340 is configured to detect and de-multiplex the download signal using a multiplexing matrix. In one embodiment, the processor 340 is configured to receive downlink control information indicating parameters used in a transmission of a downlink signal S; receive the downlink signal S, demultiplex the downlink signal and decode the downlink signal S according to the parameters received in the downlink control information; and deliver estimates of information words to the user.

Figure 4:
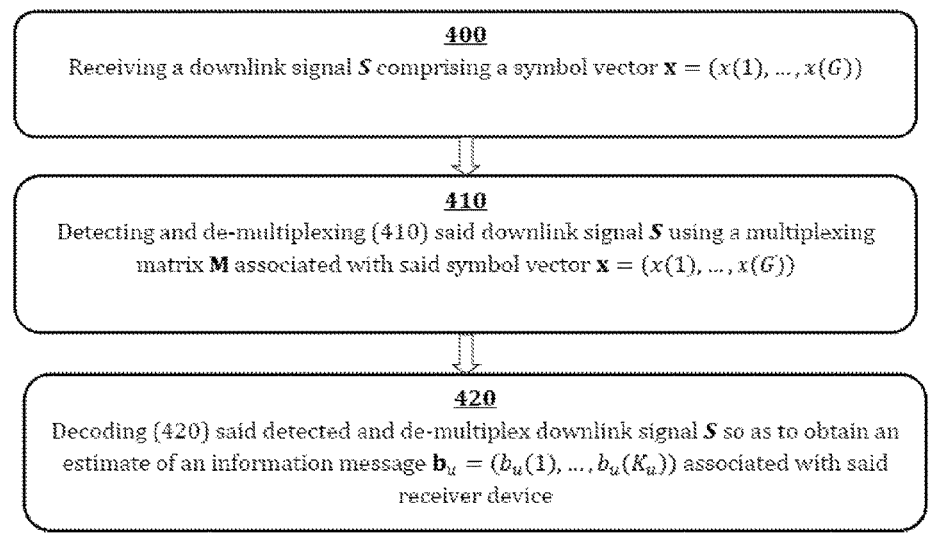
FIG. 4 is a flow chart illustrating an embodiment of the present disclosure.

FIG. 4 illustrates a receiving method that can be executed by the receiver device 300. In one embodiment, the method comprises receiving a downlink signal comprising a symbol vector, including receiving downlink control information indicating parameters used in a transmission of a downlink signal S, in a step 400. Detect and demultiplex the downlink signal using a multiplexing matrix, in a step 410. Decode the downlink signal S according to the parameters received in the downlink control information and deliver estimates of information words to the user, in a step 420.

Figure 5:
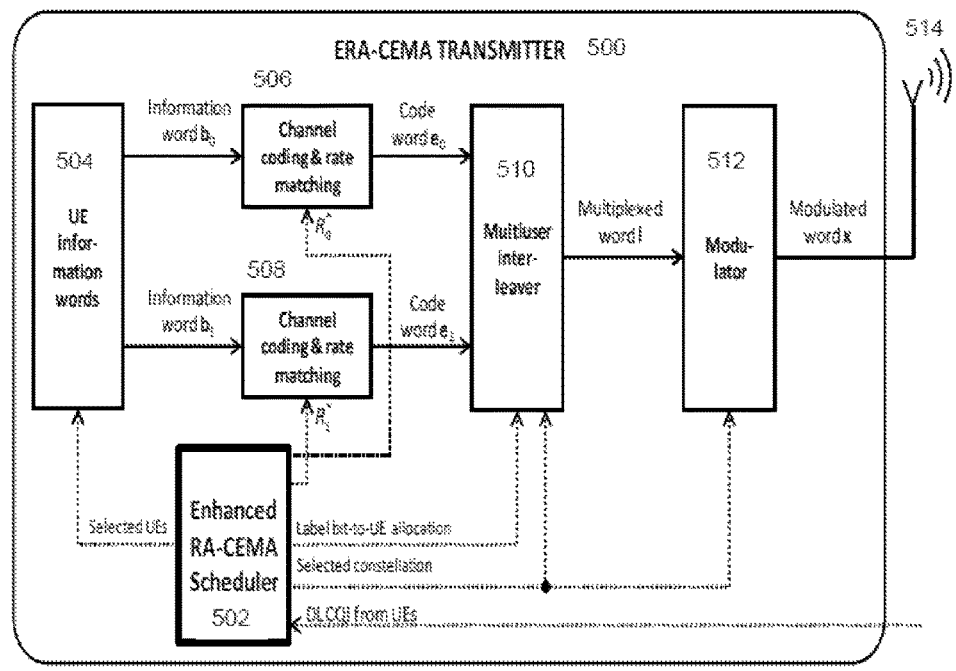
FIG. 5 illustrates an enhanced RA-CEMA transmitter according to an embodiment of the present disclosure.

FIG. 5 illustrates one embodiment of an enhanced RA-CEMA transmitter device 500 incorporating aspects of the present disclosure. The enhanced RA-CEMA transmitter device 500 is configured to carry out and execute the processes described herein. In this embodiment, two receiver devices, such as the receiver devices 300, 50 of FIG. 3 and FIG. 18, respectively, are selected for transmission. The Enhanced RA-CEMA Scheduler device 502, referred to herein as scheduler device 502 receives DL CQIs of the downlink channels for the two receiver devices through a reverse link (e.g., up-link) and selects receiver devices having different channel qualities for concurrent DL transmission. The channel qualities may e.g. be SINR, SNR, or any other suitable channel measures, or other parameters based on such channel measures such as CQI. The scheduler device 502 also performs modulation selection, computation of MCS parameters and multiplexing matrix computation as will be described below.

Figure 18:
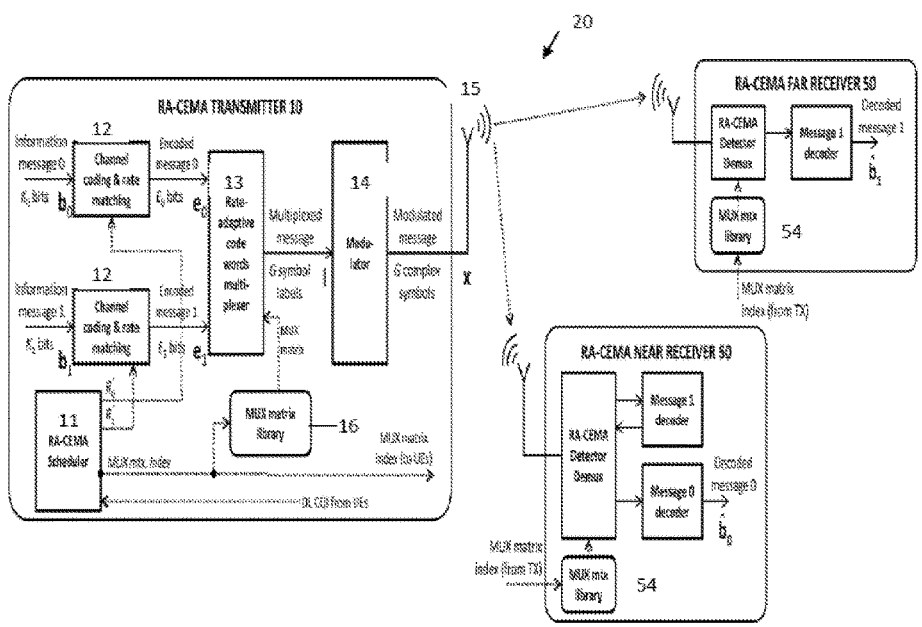
FIG. 18 illustrates a RA-CEMA system.

In accordance with the aspects of the present disclosure, and referring to FIG. 5, the information words $b_0$ and $b_1$ to be transmitted to the selected receiver devices are independently encoded and sent to the multiuser interleaver or rate-adaptive code words multiplexer device 510. The functions performed by multiuser interleaver device 510 of FIG. 5 are generally the same as those performed by the rate-adaptive code words multiplexer device 13 of the RA-CEMA system 20 shown in FIG. 18. An example of the RA-CEMA system 20 shown in FIG. 18 is described in co-pending application no. PCT/EP2014/056365, filed on 28 Mar. 2014, the disclosure of which is incorporated herein by reference in its entirety.

The multiuser interleaver device 510 performs code word multiplexing according to a RA-CEMA multiplexing matrix and generates a multiplexed word l which is modulated by modulator device 512 and transmitted by a transmitter device 514, to a user, for example.

Figure 6:
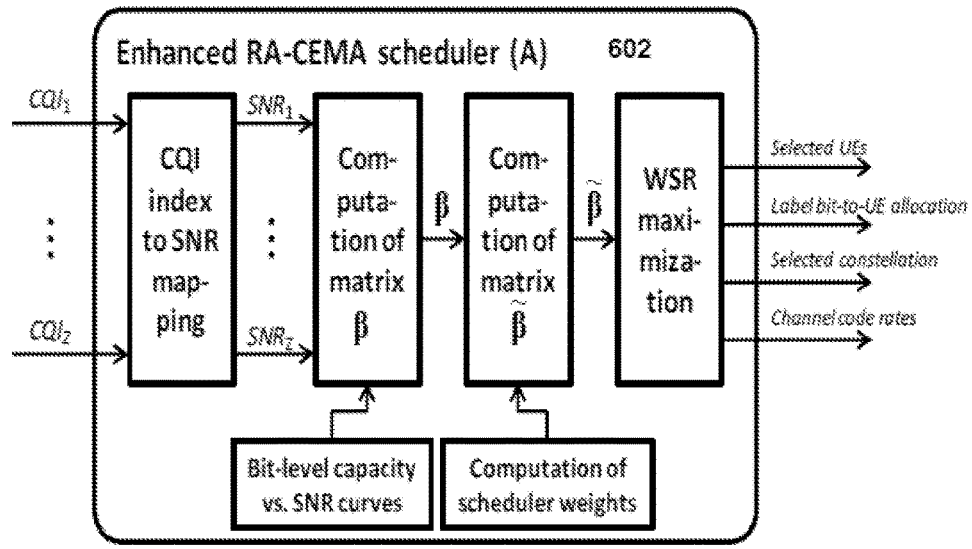
FIG. 6 illustrates an enhanced RA-CEMA scheduler according to an embodiment of the present disclosure.
Figure 7:
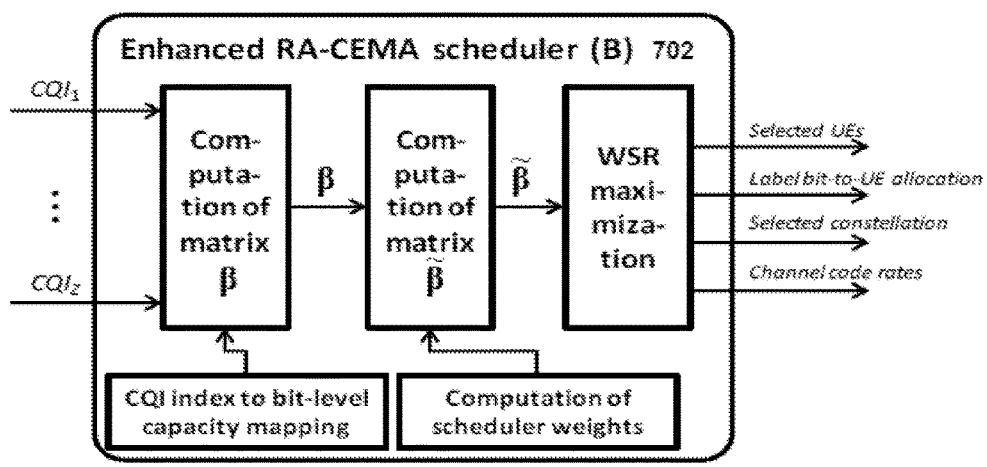
FIG. 7 illustrates an enhanced RA-CEMA scheduler according to an embodiment of the present disclosure.

As noted above, the receiver device selection, modulation selection, computation of MCS parameters and multiplexing matrix computation/selection are performed jointly by the scheduler device 502. FIGS. 6 and 7 illustrate different embodiments of a scheduler device 502 that can be used in the present disclosure.

In the embodiment shown in FIG. 6, the scheduler device 602 is configured to map the CQI indices to SNRs. Bit level capacities are computed using bit-level capacity vs. SNR curves.

In the embodiment shown in FIG. 7, the scheduler device 702 is configured to map the CQI indices directly to bit-level capacities.

The aspects of the present disclosure exploit the knowledge of the downlink channels for the receiver device CQIs and of the bit-level capacities of the available modulations in order to perform the aforementioned tasks while optimally maximizing any weighted sum rate (WSR) scheduling metric like, e.g., Proportional Fair (PF). The aspects of the present disclosure can be used in systems with wideband scheduling and/or wideband CQI reporting as well as in systems with sub-band scheduling and/or sub-band CQI reporting. In such case, the aspects of the present disclosure are configured to operate in each sub-band independently of the other sub-bands.

In RA-CEMA systems, the transmitted signal x is a sequence of G modulation symbols that will be transmitted in G REs. Modulation symbols are drawn from a selected constellation $\chi_l = \{s_1^{(l)}, \ldots, s_{M_l}^{(l)}\}$ belonging to a set of available constellations $\chi = \{\chi_1, \ldots, \chi_L\}$. Each constellation $l$, $l=1, \ldots, L$, is characterized by a size $M_l = |\chi_l|$ and an order $m_l = \log_2 M_l$. A labeling $\mathcal{L}(\chi_l)$ associates to each constellation symbol of $\chi_l$ a distinct binary vector of $m_l$ bits. For ease of notation, the use of the constellation index will be dropped hereinafter, except as needed.

Figure 8:
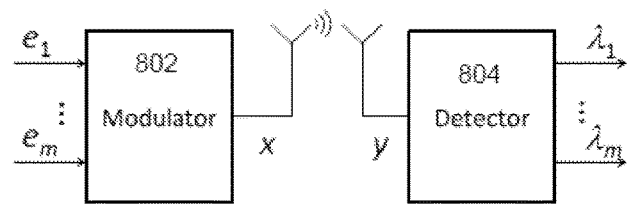
FIG. 8 illustrates and exemplary scheme for bit-interleaved coded modulation transmission.

Referring to FIG. 8, which illustrates a modulator device 802 and a detector device 804 in an exemplary scheme for bit-interleaved coded modulation transmission, each bit in the binary label of constellation $\chi$ is characterized by a bit-level capacity, conventionally defined as the mutual information of each bit in the constellation's binary label, measured when constellation symbols are transmitted on a certain channel (for example, the AWGN channel). In particular, in a conventional bit-interleaved coded modulation (BICM) scheme, at the transmitter each m-tuple $(e_1, \ldots, e_m)$ of coded bits is mapped to a constellation symbol $s \in \chi$ which is then transmitted At the receiver, the detector device 804 computes Log-Likelihood Ratios (LLRs) of the transmitted bits as:

$$\lambda_k = \log \frac{P(e_k = 1|y)}{P(e_k = 0|y)} = \log \frac{\sum_{s \in \chi: \mathcal{L}_k(s)=1} P(s|y)}{\sum_{s \in \chi: \mathcal{L}_k(s)=0} P(s|y)} \quad (1)$$

for k=1, ..., m. Here P (ε) indicates the probability that event ε occurs, y is the received signal and $\mathcal{L}_k(s)$ indicates the kth bit of the label associated to constellation symbol s. The bit-level capacity is defined as:

$$\beta_k = I(e_k; \lambda_k) \qquad (2)$$

where l(a; b) indicates the mutual information of random variables a and b. If, for example, the channel is AWGN, the bit-level capacity can be estimated as:

$$\beta_k = m = \mathbb{E}_{s,y}[\log(1+e^{\lambda_k}) - \mathcal{L}_k(s)\lambda_k] \qquad (3)$$

where m is the constellation order and $\mathbb{E}_{s,y}[.]$ denotes the expectation operator.

Figure 9:
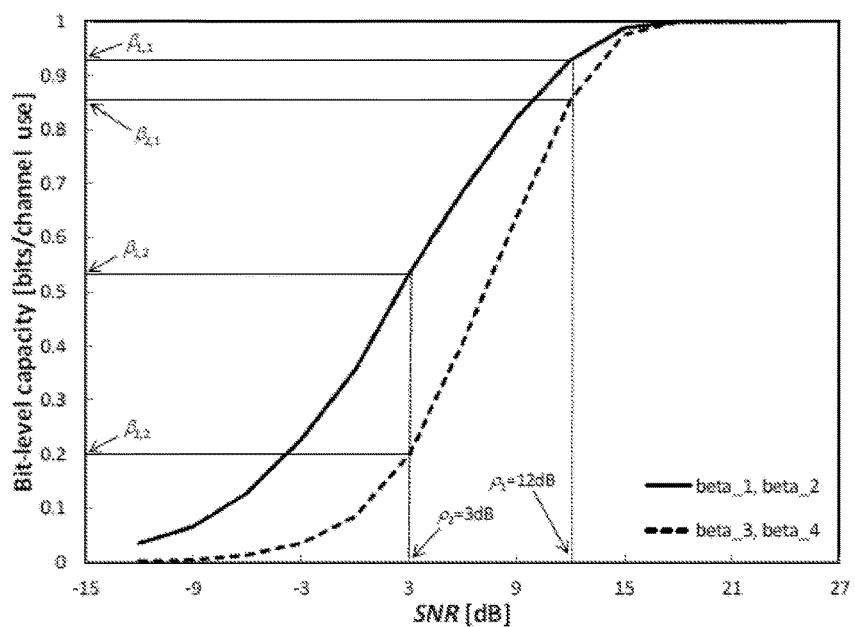
FIG. 9 illustrates Bit-level capacity vs SNR curves of 16-QAM with Gray labeling.

For most channels of practical interest, including the AWGN channel, bit-level capacities are monotone non-decreasing functions $\beta_k$, k=1, ..., m of the SNR ρ experienced on the channel. FIG. 9 illustrates an example of bit-level capacity vs. SNR curves of a 16QAM modulation with Gray labeling. When the SNR is very low, these capacities are all close to zero, while at high SNR, these all approach their maximum value. Moreover, in FIG. 9, each curve represents the bit-level capacity of two label bits. The characteristic of having multiple label bits with the same capacity is common to all QAM modulations and is due to the symmetry properties of these constellations.

The bit-level capacity of the kth label bit of user z is indicated in FIG. 9 as $\beta_k(\rho_z)$. The shorthand notation $\beta_{k,z}$ will be used herein to indicate the same quantity. In FIG. 9, the bit-level capacities of two users with SNRs of 12 dB and 3 dB are also indicated.

In systems like LTE and UMTS, the receiver devices channel quality is typically reported by the receiver devices to the transmitter in the form of a CQI index. Typically, the CQI index computation assumes orthogonal transmission to a single receiver device. The CQI index corresponds to a MCS scheme specifying parameters like modulation order, channel code type and code rate that should be used by the transmitter in order to fulfill certain link quality requirements. In UMTS and LTE, link quality requirements are specified in terms of a BLER threshold to which the receiver device refers in order to calculate the CQI (BLER=0.1 for LTE and UMTS). Each MCS scheme is characterized by a MCS rate $R = mR^{(C)}$ (here, m is the modulation order and $R^{(C)}$ is the code rate) and a BLER vs. SNR curve.

Figure 10:
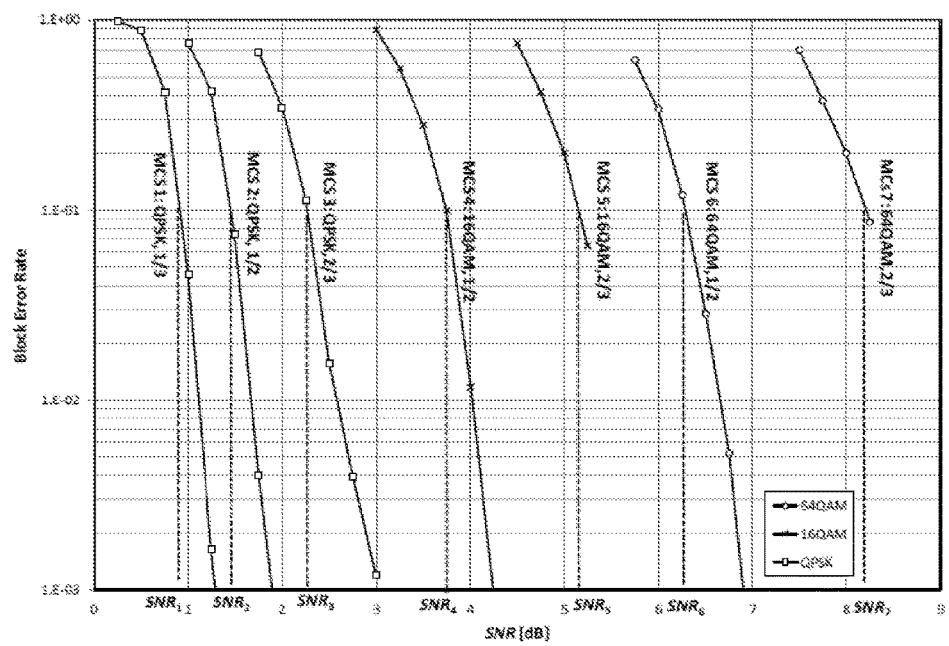
FIG. 10 illustrates block error rate (BLER) vs SNR curves for different MCS schemes.

FIG. 10 shows an example of BLER vs. SNR curves for seven different MCS schemes. SNR values corresponding to BLER=$10^{-1}$ are indicated as $SNR_1$ to $SNR_7$. For each MCS scheme, the SNR corresponding to threshold BLER=0.1 is shown. The SNR values corresponding to the BLER threshold will be called threshold SNRs. The curves of FIG. 10 have been obtained considering an AWGN channel model. However, the same approach can be used also for other kinds of channels, like frequency- and/or time-selective fading channels.

The receiver device estimates the received SNR. Based on such estimate and on the knowledge of the threshold SNRs, the receiver device determines which MCSs satisfy the link quality requirements. In order to achieve a high spectral efficiency, the receiver device typically selects the MCS that corresponds to the highest MCS rate among those satisfying the link quality requirements and reports the corresponding CQI index.

If, for example, the estimated SNR is 4.7 dB, referring to FIG. 10, then the MCSs satisfying the link quality requirement BLER≤0.1 are MCS1, MCS2, MCS3 and MCS4. Among these, the receiver device will select the MCS corresponding to the highest MCS rate, i.e. MCS4 and report the corresponding CQI.

Each CQI index, through its corresponding MCS scheme, can therefore be mapped to a threshold SNR value. Such mapping can be conveniently stored in a small table, such as Table 1, below. The enhanced RA-CEMA scheduler 602 shown in FIG. 6 Error! Reference source not found. maps the receiver device CQI indices to threshold SNR values using such a table and then computes, for each available modulation, the bit-level capacities corresponding to those SNRs using the bit-level capacity vs. SNR curves.

TABLE 1

Example of table specifying the mapping of CQI indices to SNR values.

| CQI index | SNR |
|---|---|
| 1 | $SNR_1$ |
| 2 | $SNR_2$ |
| ... | ... |
| $CQI_{MAX}$ | $SNR_{CQI_{MAX}}$ |

In one embodiment of the present disclosure, the bit-level capacities corresponding to each threshold SNR—hence to each CQI index—can be pre-computed, stored in a table such as Table 2 below, and made available to the transmitter 500 of FIG. 5. In this embodiment, it is not needed to perform CQI to SNR mapping, since the bit-level capacities can be directly obtained using the CQI index. The scheduler 702 shown in FIG. 7 directly maps receiver devices' CQI indices to bit-level capacities using the information stored in a table, such as Table 2 below.

TABLE 2

Example of table specifying the direct mapping of CQI indices onto bit-level capacities.

| CQI index | QPSK | 16 QAM | | 64QAM | | |
|---|---|---|---|---|---|---|
| | $b_1$ | $b_1$ | $b_2$ | $b_1$ | $b_2$ | $b_3$ |
| 1 | $\beta_{QPSK}^{(1)}$ | $\beta_{16QAM,1}^{(1)}$ | $\beta_{16QAM,2}^{(1)}$ | $\beta_{64QAM,1}^{(1)}$ | $\beta_{64QAM,2}^{(1)}$ | $\beta_{64QAM,3}^{(1)}$ |
| 2 | $\beta_{QPSK}^{(2)}$ | $\beta_{16QAM,1}^{(2)}$ | $\beta_{16QAM,2}^{(2)}$ | $\beta_{64QAM,1}^{(2)}$ | $\beta_{64QAM,2}^{(2)}$ | $\beta_{64QAM,3}^{(2)}$ |
| ... | ... | ... | ... | ... | ... | ... |
| $CQI_{MAX}$ | $\beta_{QPSK}^{(CQIMAX)}$ | $\beta_{16QAM,1}^{(CQIMAX)}$ | $\beta_{16QAM,2}^{(CQIMAX)}$ | $\beta_{64QAM,1}^{(CQIMAX)}$ | $\beta_{64QAM,2}^{(CQIMAX)}$ | $\beta_{64QAM,3}^{(CQIMAX)}$ |

Figure 11:
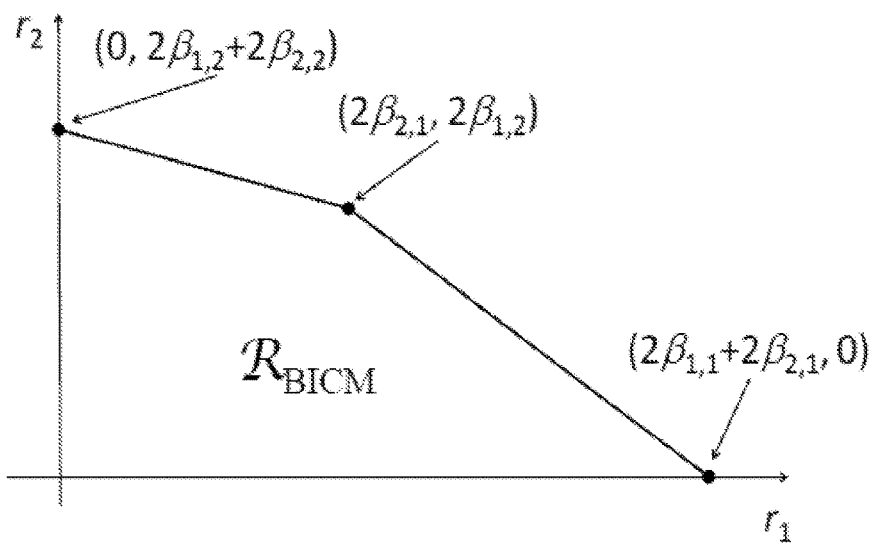
FIG. 11 illustrates the BICM rate region of a system with two UEs using 16 QAM.

Using the obtained bit-level capacity values, we define the BICM rate region $\mathcal{R}_{BICM}$ of the associated Gaussian broadcast channel, as shown in FIG. 11 for the case of two receiver devices and 16QAM. The relationship between bit-level capacities and receiver devices' achievable rates is explained as follows:

When all the four label bits of 16QAM are assigned to $UE_1$, then $UE_1$ can transmit at any rate $r_1 \leq 2\beta_{1,1} + 2\beta_{2,1}$, where $\beta_{1,1}$ (resp. $\beta_{2,1}$) is the bit-level capacity of the high-capacity (resp. low-capacity) bits of 16QAM at the $UE_1$ SNR (recall that 16QAM has two strong bits and two weak bits).

When all the four label bits are assigned to $UE_2$, then $UE_2$ can transmit at any rate $r_1 \leq 2\beta_{1,2} + 2\beta_{2,2}$, where $\beta_{1,2}$ (resp. $\beta_{2,2}$) is the bit-level capacity of the high-capacity (resp. low-capacity) bits of 16QAM at the $UE_2$ SNR.

When the two high-capacity bits are assigned to $UE_2$ and the other bits are assigned to $UE_1$, then $UE_1$ and $UE_2$ can simultaneously transmit information at rates $r_1 \leq 2\beta_{2,1}$ and $r_2 \leq 2\beta_{1,2}$.

In general, the rate $r_z$ at which $UE_z$ can transmit cannot exceed the sum of the bit-level capacities of the label bits assigned to such UE:

$$r_z \leq \sum_{k=1}^{m} a_{k,z} \beta_{k,z} \qquad (4)$$

where $a_{k,z}=1$ if the kth label bit has been allocated to $UE_z$, and $a_{k,z}=0$ otherwise.

For each label bit k, only one UE is allowed to transmit, therefore $a_{k,z}$ takes value 1 only for one value $\hat{z}(k)$. This indicates that $UE_z$ is allowed to transmit using label bit k and no other UE can use that bit. Function $\hat{z}(k)$ will be called label bit-to-UE (receiver device) allocation. Using $\hat{z}(k)$, the summation in (4) can be rewritten as:

$$r_z \leq \sum_{k:\hat{z}(k)=z} \beta_{k,z}. \qquad (5)$$

In words, the transmission rate $r_z$ of $UE_z$ cannot exceed the sum of the bit-level capacities of label bits allocated to $UE_z$.

For a certain modulation $\chi$, binary labeling $\mathcal{L}(\chi)$ and receiver device SNRs $\rho_1, \ldots, \rho_Z$, the bit level capacities of the receiver devices are collected in a m×Z matrix $\beta=(\beta_{k,z})$, where:

$$\beta = \begin{bmatrix} \beta_{1,1} & \cdots & \beta_{1,z} \\ \vdots & \ddots & \vdots \\ \beta_{m,1} & \cdots & \beta_{m,z} \end{bmatrix}. \qquad (6)$$

Its generic element $\beta_{k,z}$ in equation (6), indicates the bit-level capacity of the kth label bit when used to transmit to $UE_z$. The SNR $\rho_z$—or average SNR in the case of fading channels is assumed to be constant over a set of REs of G symbols. The bit level capacities can be computed by the scheduler device 502 using a suitable approximation, such as a simple function that approximates the real bit-level capacity functions $\beta_k(\rho)$ or they can be obtained using look-up tables as the one shown in Table 2, above.

The goal of the scheduler device 502 of FIG. 5 is to select a set of receiver devices for transmission, select an expanded constellation and a label bit-to-UE allocation that maximizes the weighted sum rate $\tilde{R}(r)=w_1 r_1 + \ldots + w_Z r_Z$, where $r=(r_1, \ldots, r_Z)$ is a rate vector belonging to the rate region $\mathcal{R}_{BICM}$. In doing so, the scheduler device 502 computes the maximum weighted sum rate (WSR):

$$\tilde{R}^* = \tilde{R}(r^*) = \max_{r \in \mathcal{R}_{BICM}} \sum_{z=1}^{Z} w_z r_z \qquad (7)$$

and finds the rate vector r* for which the WSR $\tilde{R}$ is maximized. Here, $w_z$ is a user-specific weight coefficient.

Figure 12:
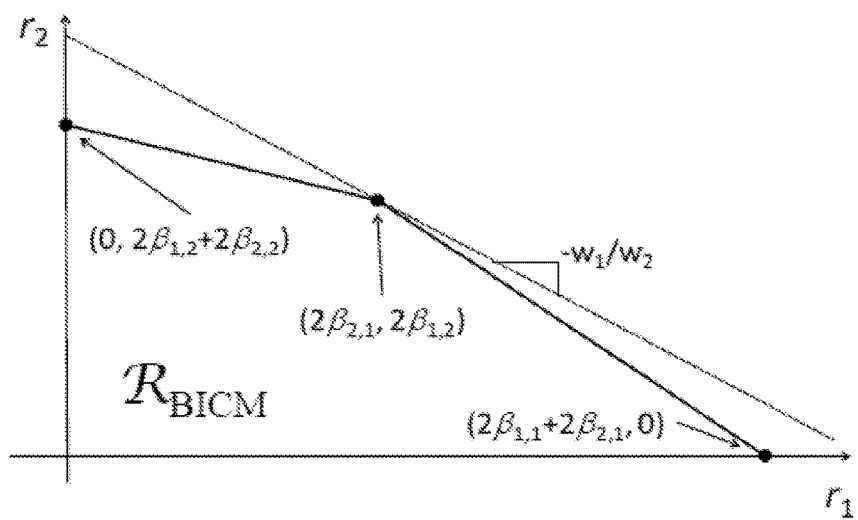
FIG. 12 illustrates the optimal rate pair and the Proportional Fair (PF) scheduler line for transmission in a system with two UEs using 16 QAM.

It is a well known result of integer linear programming optimization that for a given set of users' weights $w=(w_1, \ldots, w_Z)$, the rate vector r* that optimizes the WSR in equation (7) corresponds to a vertex of the BICM rate region $\mathcal{R}_{BICM}$ of FIG. 11. For example, the graph in FIG. 12 illustrates the rate region $R_{BICM}$ in the two-receiver device case with 16QAM. Assume that the WSR weights computed at the current TTI are $w_1$, $w_2$. Then, on the $(r_1, r_2)$ plane, different (constant) values of the WSR are represented by straight lines with slope $-w_1/w_2$ satisfying the equation $\tilde{R}=w_1 r_1 + w_2 r_2$, with $\tilde{R}$ being constant.

The dashed line shown in FIG. 12 is the constant WSR line corresponding to the maximum WSR on the rate region $R_{BICM}$ and is characterized by the WSR value $\tilde{R}^*=2w_1\beta_{2,1}+2w_2\beta_{1,2}$ achieved at $(r_1^*, r_2^*)=(2\beta_{2,1}, 2\beta_{1,2})$. It is easy to show that, for the given weights $w_1$, $w_2$ this value is the optimal. In particular, any value $\tilde{R}>\tilde{R}^*$ would correspond to lines $\tilde{R}=w_1 r_1 + w_2 r_2$ passing through unfeasible rate vectors $r=(r_1, r_2) \notin \mathcal{R}_{BICM}$, whilst any other rate vector $r=(r_1, r_2) \in \mathcal{R}_{BICM}$ belongs to lines corresponding to WSR values $\tilde{R}<\tilde{R}^*$. The WSR-maximizing rate vector is therefore $r^*=(r_1^*, r_2^*)=(2\beta_{2,1}, 2\beta_{1,2})$.

In general, for any value of $w_1/w_2$ illustrated in FIG. 12, the WSR-maximizing rate vector r* always corresponds to a vertex of the rate region $\mathcal{R}_{BICM}$, except when the constant-WSR line is parallel to one of the sides of the rate region $\mathcal{R}_{BICM}$. In such case, any rate vector lying on the side of the rate region $R_{BICM}$ which is parallel to the constant-WSR line achieves the maximum WSR. Also the two end points of such side—which are also vertices of the rate region $R_{BICM}$—are maximum WSR rate vectors. Therefore, the set of WSR-maximizing rate vectors always includes at least one vertex of the rate region $R_{BICM}$.

The maximum WSR equation (7) can be rewritten using equation (5) as:

$$\tilde{R}^* = \max_{\hat{z}(k)} \sum_{z=1}^{Z} w_z \sum_{k:\hat{z}(k)=z} \beta_{k,z} = \max_{\hat{z}(k)} \sum_{z=1}^{Z} \sum_{k:\hat{z}(k)=z} \tilde{\beta}_{k,z} \qquad (8)$$

where the maximization is performed over all possible label bit-to-UE allocations $\hat{z}(k)$. We define the weighted bit-level capacity $\tilde{\beta}_{k,z}=w_z\beta_{k,z}$ and the corresponding weighted bit-level capacity matrix as:

$$\tilde{\beta} = \begin{bmatrix} \tilde{\beta}_{1,1} & \cdots & \tilde{\beta}_{1,z} \\ \vdots & \ddots & \vdots \\ \tilde{\beta}_{m,1} & \cdots & \tilde{\beta}_{m,z} \end{bmatrix}. \qquad (9)$$

Figure 13:
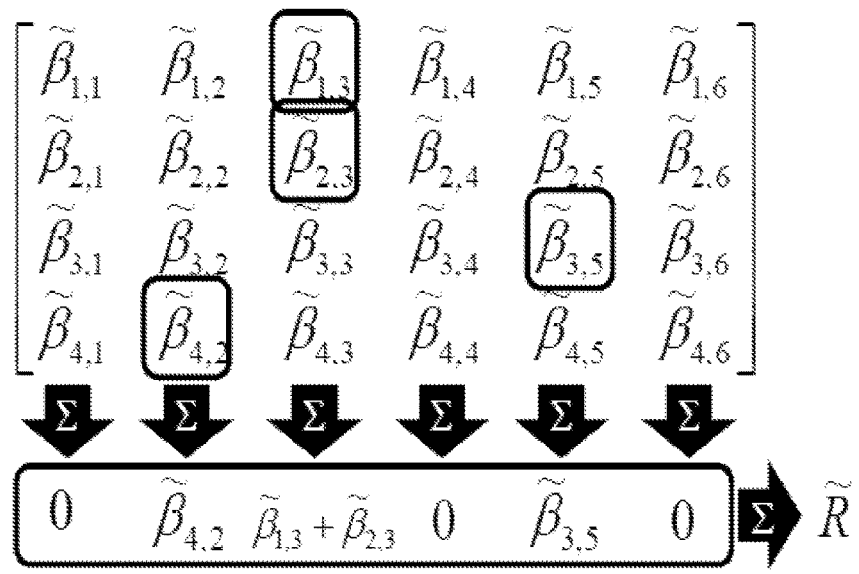
FIG. 13 illustrates the computation of WSR according to a first algorithm incorporating aspects of the disclosed embodiments.

An example of computation of the WSR according to equation (8) is represented in FIG. 13, where a weighted bit-level capacity matrix $\tilde{\beta}$ for a system with Z=6 receiver devices using a constellation of order m=4 is shown. The column-wise sums are performed only on the elements for which k: $\hat{z}(k)=z$ (the highlighted elements in FIG. 13). One of the possible label bit-to-UE allocations $\hat{z}(k)$ has been represented in FIG. 13 as: $\hat{z}(1)=\hat{z}(2)=3$, $\hat{z}(3)=5$, $\hat{z}(4)=2$. The operations shown in FIG. 13 have to be repeated for all possible values of $\hat{z}(k)$ (a very large number of times: $Z^m$).

Now, in order to simplify computations, we exchange the order of summations in equation (8): instead of summing, for each $UE_z$ the corresponding set of label bits k: $\hat{z}(k)=z$, we consider for each label bit k the corresponding UE $\hat{z}(k)$. Equation (8) then simplifies as:

$$\tilde{R}^* = \max_{\hat{z}(k)} \sum_{k=1}^{m} \tilde{\beta}_{k,\hat{z}(k)} = \sum_{k=1}^{m} \max_{\hat{z}(k)} \tilde{\beta}_{k,\hat{z}(k)} = \sum_{k=1}^{m} \tilde{\beta}_{k,\hat{z}^*(k)}. \quad (10)$$

where $\hat{z}^*(k)$ is the label bit-to-UE allocation that maximizes the WSR.

Figure 14:
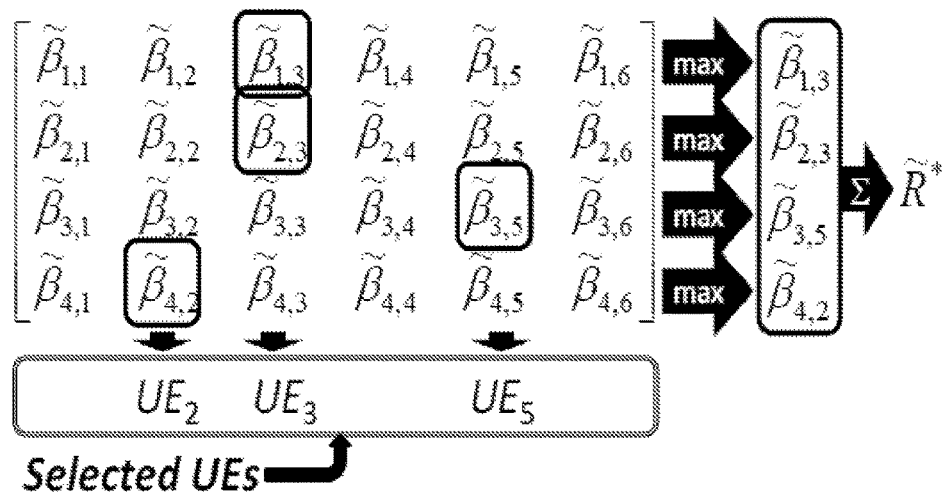
FIG. 14 illustrates the computation of WSR according to a second algorithm incorporating aspects of the disclosed embodiments.

The formulation in equation (10) is particularly convenient because it shows that the maximization of the WSR can be carried out by maximizing the weighted bit-level capacities $\tilde{\beta}_{k,z}$ independently for each label bit k. This is illustrated in FIG. 14. The maximum weighted bit-level capacity $\tilde{\beta}_{k,z}$ in each row of the matrix is highlighted.

The task of finding the WSR-maximizing label bit-to-UE allocation $\hat{z}^*(k)$ and the corresponding maximum WSR $\tilde{R}^*$ can therefore be accomplished in a few simple steps:

1. Compute the matrix of weighted bit-level capacities $\tilde{\beta}=(\tilde{\beta}_{k,z})$, where $\tilde{\beta}_{k,z}=w_z\beta_{k,z}\forall k=1,\ldots,m, \forall z=1,\ldots,Z$,
2. For each $k=1,\ldots,m$, find the maximum value of weighted bit-level capacity $\tilde{\beta}_{k,z}$ and obtain the corresponding UE index $\hat{z}=2^*(k)$.
3. Compute the maximum WSR $\tilde{R}^*$ using equation (10).

The first step above requires mZ multiplications to compute the weighted bit-level capacities in $\tilde{\beta}$; the second step requires m(Z−1) comparisons and the third step requires m−1 sums.

For certain modulations, multiple label bits exhibit the same bit-level capacity. In such case, the number of operations can be reduced. For example, in M-QAM we have $m=\log_2 M$ label bits and m/2 different capacity levels. In such case, the first step above requires mZ/2 multiplications to compute the weighted bit-level capacities in $\tilde{\beta}$; the second step requires m(Z−1)/2 comparisons to find the maxima and the third step requires m−1 sums.

Clearly, if L>1 modulations are available, the three steps above have to be repeated for each of such modulations, obtaining L different WSR values $\tilde{R}_l^*=\tilde{R}^*(\chi_l)$, $l=1,\ldots,L$ (where constellation $\chi_l$ belongs to the set of available constellations $\chi=\{\chi_1,\ldots,\chi_L\}$) and corresponding label bit-to-UE allocations $\hat{z}_l^*(k)$. The highest among the computed maximum WSR values $\tilde{R}_l^{**}=\max_{l=1,\ldots,L}\tilde{R}_l^*$ will be obtained and the corresponding constellation $\chi_l^*$ will be selected for transmission. The order of $\chi_l^*$ will be indicated with m*. Moreover, the corresponding label bit-to-UE allocation $\hat{z}_l^{**}(k)$ will be selected.

Selected Receiver Devices and Channel Coding Parameters.

Referring also to the step 210 of FIG. 2, the number of label bits allocated to $UE_z$ is $m_z^*=|k:\hat{z}_l^{**}(k)=z|$. Together with the computation of the label bit-to-UE allocation, in the same time, a set of the receiver devices selected for transmission is also selected. The receiver devices selected for transmission are those allowed to use at least one label bit for transmission, i.e. $m_z^* \geq 1$.

Since G is the number of available REs, the size of the receiver device code words, referring to the step 214 in FIG. 2, is determined as:

$$E_z = m_z^* G \quad (11)$$

We observe that the knowledge of the label bit-to-UE allocation $\hat{z}_l^{**}(k)$ is sufficient in order to compute the set of selected receiver devices and the code word sizes E. Clearly, only the selected receiver devices have code word size $E_z>0$.

The maximum coding rate $R_z^{(C)}=K_z/E_z$ used for encoding the information word transmitted to $UE_z$, referring to the step 216 of FIG. 2, can be computed as:

$$R_z^{(C)} = \frac{1}{m_z^*} \sum_{k:\hat{z}^*(k)=z} \beta_{k,z} \quad (12)$$

where the summation in equation (12) represents the aggregate bit-level capacity available to $UE_z$. The corresponding maximum information word size can be obtained as $K_z=R_z^{(C)}E_z$. In order to compute coding rates resulting in sufficiently low error rates, it is necessary to perform a correction to $R_z^{(C)}$ that takes into account the code word size $E_z$. The corrected code rate would be $\check{R}_z^{(C)}f=R_z^{(C)}f(E_z)$, where $f(E_z)$ is between 0 and 1, and the corrected information word size would be $\check{K}_z=\check{R}_z^{(C)}E_z$.

If, in the transmission system, a finite number of code rates are available, the highest one among those which do not exceed $R_z^{(C)}$ or $\check{R}_z^{(C)}$ should be chosen in order to maximize the spectral efficiency.

Multiplexing Matrix Generation.

Using the determined label bit-to-UE allocation, referring also to the step 212 in FIG. 2, a multiplexing matrix is generated as:

$$M = \begin{bmatrix} e_{\hat{z}_l^*(1)}(1) & e_{\hat{z}_l^*(1)}(2) & e_{\hat{z}_l^*(1)}(3) & \ldots & e_{\hat{z}_l^*(1)}(G) \\ e_{\hat{z}_l^*(2)}(1) & e_{\hat{z}_l^*(2)}(2) & e_{\hat{z}_l^*(2)}(3) & \ldots & e_{\hat{z}_l^*(2)}(G) \\ \ldots & \ldots & \ldots & \ldots & \ldots \\ e_{\hat{z}_l^*(\hat{m})}(1) & e_{\hat{z}_l^*(\hat{m})}(2) & e_{\hat{z}_l^*(\hat{m})}(3) & \ldots & e_{\hat{z}_l^*(\hat{m})}(G) \end{bmatrix} \quad (13)$$

where $e_{\hat{z}_l^{}(k)}(i)$ is the ith bit of the codeword generated by encoding the information word for receiver device $\hat{z}_l^{}(k)$ allocated to the label bit k. We assume by convention that the upper rows of the multiplexing matrix correspond to label bits with higher bit-level capacity. Such a matrix is used by the multiuser interleaver 510 in the enhanced RA-CEMA transmitter 500 of FIG. 5 to perform code word multiplexing and, at the receivers, to perform de-multiplexing.

In equation (13), we assumed that the m label bits have been allocated to m different receiver devices (i.e., $m_z^* \leq 1$). In this case, all code words have the same length of G coded bits. In general, multiple label bits can be allocated to the same receiver device (i.e., $m_z^*>1$ for some $z=1,\ldots,Z$) and, in such case, the code words may have different lengths. The following example shows a case in which the second and third label bits (k=2, 3) are allocated to the same receiver device:

$$M = \begin{bmatrix} e_{\hat{z}_{l^*}^*(1)}(1) & e_{\hat{z}_{l^*}^*(1)}(2) & e_{\hat{z}_{l^*}^*(1)}(3) & \ldots & e_{\hat{z}_{l^*}^*(1)}(G) \\ e_{\hat{z}_{l^*}^*(2)}(1) & e_{\hat{z}_{l^*}^*(2)}(2) & e_{\hat{z}_{l^*}^*(2)}(3) & \ldots & e_{\hat{z}_{l^*}^*(2)}(G) \\ e_{\hat{z}_{l^*}^*(2)}(G+1) & e_{\hat{z}_{l^*}^*(2)}(G+2) & e_{\hat{z}_{l^*}^*(2)}(G+3) & \ldots & e_{\hat{z}_{l^*}^*(2)}(2G) \\ \ldots & \ldots & \ldots & \ldots & \ldots \\ e_{\hat{z}_{l^*}^*(\hat{m})}(1) & e_{\hat{z}_{l^*}^*(\hat{m})}(2) & e_{\hat{z}_{l^*}^*(\hat{m})}(3) & \ldots & e_{\hat{z}_{l^*}^*(\hat{m})}(G) \end{bmatrix} \quad (14)$$

In this case, the code word of $UE_{\hat{z}_i^{**}(2)}$ has size 2G coded bits.

Example 1

Consider a system with Z=4 receiver devices whose SNRs are $\rho_1$=15 dB, $\rho_2$=10.5 dB, $\rho_3$=7.5 dB, $\rho_4$=3 dB. We assume that 64QAM constellation $\chi_1$ with Gray labeling is available. The bit-level capacities for this modulation and labeling are shown in FIG. 15.

Figure 15:
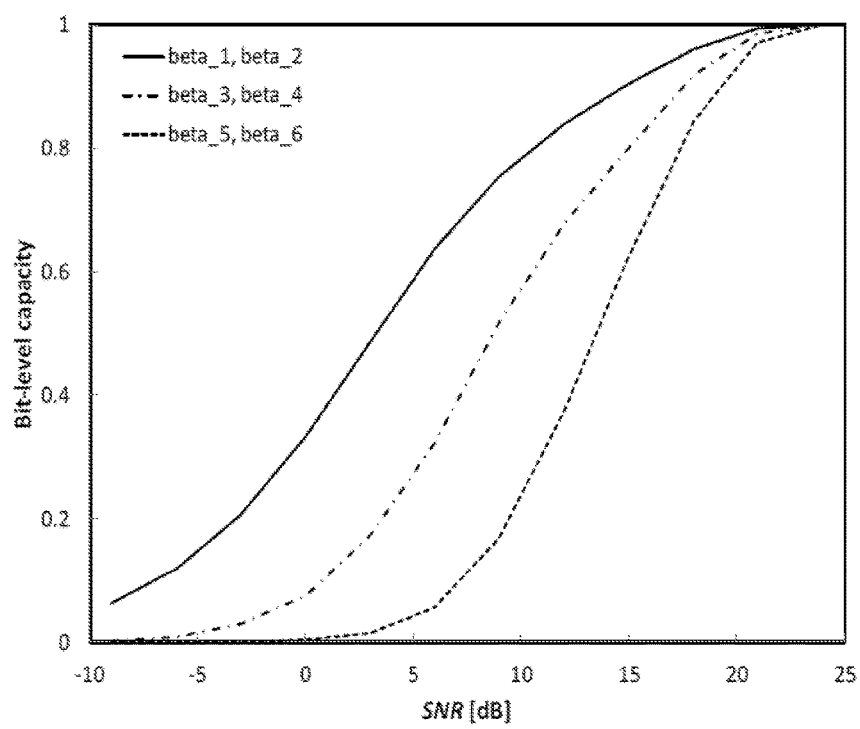
FIG. 15 illustrates the bit-level capacities of 64 QAM with Gray labeling.

From the graph of FIG. 15, we obtain the corresponding bit-level capacities and fill the bit-level capacity matrix as:

$$\beta_1 = \begin{bmatrix} 0.9 & 0.8 & 0.7 & 0.48 \\ 0.9 & 0.8 & 0.7 & 0.48 \\ 0.8 & 0.6 & 0.43 & 0.17 \\ 0.8 & 0.6 & 0.43 & 0.17 \\ 0.62 & 0.28 & 0.12 & 0.04 \\ 0.62 & 0.28 & 0.12 & 0.04 \end{bmatrix} \quad (15)$$

Assume that, at the beginning of a certain transmission time interval (TTI), the WSR scheduling weights are $w_1$=0.35, $w_2$=0.65, $w_3$=1.25, $w_4$=1.9. Then, the weighted bit-level capacity matrix is:

$$\tilde{\beta}_1 = \begin{bmatrix} 0.315 & 0.52 & 0.875 & 0.912 \\ 0.315 & 0.52 & 0.875 & 0.912 \\ 0.28 & 0.39 & 0.5375 & 0.323 \\ 0.28 & 0.39 & 0.5375 & 0.323 \\ 0.217 & 0.182 & 0.15 & 0.076 \\ 0.217 & 0.182 & 0.15 & 0.076 \end{bmatrix} \quad (16)$$

The label bit-to-UE allocation that maximizes the WSR has been highlighted using boldface digits in matrix (16). The corresponding maximum WSR is the sum of the elements in bold and its value is $\hat{R}_1^*$=3.33. As a result, we obtain the optimal label bit-to-UE allocation shown in Table 3.

TABLE 3

Label bit-to-UE allocation.

| k | $\hat{z}_1^*$ (k) |
|---|---|
| 1 | 4 |
| 2 | 4 |
| 3 | 3 |
| 4 | 3 |
| 5 | 1 |
| 6 | 1 |

If a second constellation $\chi_2$ was available, the procedure of obtaining $\beta$, computing $\tilde{\beta}$, the corresponding $\tilde{R}_2^*$ and $\hat{z}_2^*$(k) has to be repeated also for that constellation. The constellation $\chi_{l^*}^*$ with highest $\tilde{R}_1^*$ would be selected and its corresponding label bit-to-UE allocation employed. If, for example, the second constellation is the 16QAM constellation with Gray labeling whose bit-level capacities are shown in FIG. 9, the corresponding bit-level capacity matrix is:

$$\beta_2 = \begin{bmatrix} 0.99 & 0.88 & 0.75 & 0.53 \\ 0.99 & 0.88 & 0.75 & 0.53 \\ 0.98 & 0.75 & 0.52 & 0.2 \\ 0.98 & 0.75 & 0.52 & 0.2 \end{bmatrix}. \quad (17)$$

As before, we assume that the WSR scheduling weights are $w_1$=0.35, $w_2$=0.65, $w_3$=1.25, $w_4$=1.9. Then, the weighted bit-level capacity matrix is $$\tilde{\beta}_2 = \begin{bmatrix} 0.3465 & 0.572 & 0.9375 & 1.007 \\ 0.3465 & 0.572 & 0.9375 & 1.007 \\ 0.343 & 0.4875 & 0.65 & 0.38 \\ 0.343 & 0.4875 & 0.65 & 0.38 \end{bmatrix}. \quad (18)$$

The label bit-to-UE allocation that maximizes the WSR has been highlighted using boldface digits in matrix (18). The corresponding maximum WSR is the sum of the elements in bold and its value is $\tilde{R}_2^*$=3.314. As a result, we obtain the optimal label bit-to-UE allocation shown in Table 4.

TABLE 4

Label bit-to-UE allocation.

| k | $\hat{z}_2^*$ (k) |
|---|---|
| 1 | 4 |
| 2 | 4 |
| 3 | 3 |
| 4 | 3 |

Since $\tilde{R}_2^* < \tilde{R}_1^*$, the first constellation (i.e., $\chi_1$: 64 QAM with Gray labeling) will be selected and the corresponding label bit-to-UE allocation $\hat{z}_1^*$(k) employed to generate a corresponding multiplexing matrix of size G×m* (here, m*=6) as:

$$M = \begin{bmatrix} e_4(1) & e_4(2) & e_4(3) & \ldots & e_4(G) \\ e_4(G+1) & e_4(G+2) & e_4(G+3) & \ldots & e_4(2G) \\ e_3(1) & e_3(2) & e_3(3) & \ldots & e_3(G) \\ e_3(G+1) & e_3(G+2) & e_3(G+3) & \ldots & e_3(2G) \\ e_1(1) & e_1(2) & e_1(3) & \ldots & e_1(G) \\ e_1(G+1) & e_1(G+2) & e_1(G+3) & \ldots & e_1(2G) \end{bmatrix} \quad (19)$$

Here, the selected receiver devices are $UE_4$, $UE_3$ and $UE_1$. Their code word lengths are $E_1=E_3=E_4=2G$.

Example 2

The following example considers transmission to two receiver devices UE1, UE2, with SNRs $\rho_1$=3 dB, $\rho_2$=3 dB using a Gray-labeled 64QAM constellation. The scheduler weights are $w_1$=0.5, $w_2$=3. The bit-level capacity matrix can be filled reading the bit-level capacity values corresponding to the receiver device SNRs shown in FIG. 15 and the weighted bit-level capacity matrix can be computed using the given WSR weights. Their values are:

$$\beta = \begin{bmatrix} 0.4908 & 0.2123 \\ 0.4908 & 0.2123 \\ 0.1743 & 0.0277 \\ 0.1743 & 0.0277 \\ 0.0129 & 0.0024 \\ 0.0129 & 0.0024 \end{bmatrix};\quad (20)$$

$$\tilde{\beta} = \begin{bmatrix} 0.2454 & 0.6369 \\ 0.2454 & 0.6369 \\ 0.0872 & 0.0831 \\ 0.0872 & 0.0831 \\ 0.0064 & 0.0071 \\ 0.0064 & 0.0071 \end{bmatrix}.$$

The label bit-to-UE allocation that maximizes the WSR has been highlighted using boldface digits in (20). The corresponding maximum WSR is the sum of the elements in bold and its value is $\tilde{R}^*=1.46$. This results in the optimal label bit-to-UE allocation shown in Table 5.

TABLE 5

Label bit-to-UE allocation.

| k | $\hat{z}^*(k)$ |
|---|---|
| 1 | 2 |
| 2 | 2 |
| 3 | 1 |
| 4 | 1 |
| 5 | 2 |
| 6 | 2 |

The optimal label bit-to-UE allocation shown in Table 5 is employed to generate the corresponding multiplexing matrix of size $G \times m^*$ (here, $m^*=6$) as:

$$M = \begin{bmatrix} e_2(1) & e_2(2) & e_2(3) & \ldots & e_2(G) \\ e_2(G+1) & e_2(G+2) & e_2(G+3) & \ldots & e_2(2G) \\ e_1(1) & e_1(2) & e_1(3) & \ldots & e_1(G) \\ e_1(G+1) & e_1(G+2) & e_1(G+3) & \ldots & e_1(2G) \\ e_2(2G+1) & e_2(2G+2) & e_2(2G+3) & \ldots & e_2(3G) \\ e_2(3G+1) & e_2(3G+2) & e_2(3G+3) & \ldots & e_2(4G) \end{bmatrix}\quad (20)$$

The code words of the two selected receiver devices have size $E_1=2G$ and $E_2=4G$.

Signaling.

Concerning signaling, the transmitter device 500 of FIG. 5 has to transmit to the selected receiver devices a set of parameters that specify the multiplexing matrix and therefore allow the receiver device to generate such matrix. The multiplexing matrix is specified through the following parameters:

1) the number of resource elements G, corresponding to the number of columns of the multiplexing matrix;
2) the order (or index) of the selected modulation $m_l^{**}$, corresponding to the number of rows of the multiplexing matrix;
3) the label bit-to-UE allocation $\hat{z}_l^{**}(k)$, a vector of $m_l\%$ small integers.

This information is sufficient for the receiver devices, such as the receiver devices 300, 50 shown in FIGS. 3 and 18, respectively, to be able to generate the corresponding multiplexing matrix. Moreover, since the knowledge of $\hat{z}_l^{**}(k)$ is sufficient in order to compute the receiver device code word size $E_z$, it is not necessary to explicitly signal $E_z$.

As an alternative, we can assume that the transmitter 100, 500 of FIGS. 1 and 5, respectively, and the receiver devices 300, 50 of FIGS. 3 and 18, respectively, have access to a library of multiplexing matrices stored in a memory. Signaling could be performed by transmitting a matrix index that allows receivers to retrieve a corresponding multiplexing matrix from the library and use it for demultiplexing their signals.

The code rates $\check{R}_z^{(C)}$ or corresponding information word sizes have to be signaled to receiver devices.

The control information needed to configure concurrent downlink transmission to multiple users can be transmitted as part of a downlink control information (DCI) format with a UE-specific control signal.

In a preferred embodiment, the UE-specific DCI format comprises at least one of: an allocation of time-frequency resources, a $K_1$-bit field indicating the code rate $\check{R}_z^{(C)}$ of UE z, a $K_2$-bit field indicating the selected multiplexing matrix and a $K_3$-bit field indicating the value in the selected multiplexing matrix to which the current receiver device corresponds. Upon receiving and correctly decoding this control information, the receiver device is implicitly made aware, from the allocation of time-frequency resources, of the number of resource elements G used for concurrent downlink transmission with other receiver devices. The receiver device is explicitly signaled the selected multiplexing matrix, from which it derives the order $m_l^{**}$ and the label bit-to-UE allocation for the receiver device. Therefore, this method has the advantage to enable configuring concurrent downlink transmission to multiple receiver devices without signaling the modulation and label bit-to-receiver device allocation. A DCI of this format is transmitted to the receiver devices multiplexed on the same indicated allocation of time-frequency resources.

In another preferred embodiment, the UE-specific DCI format carries at least an allocation of time-frequency resources, a $K_1$-bit field indicating the code rate $\check{R}_z^{(C)}$ of UEz, a $K_4$-bit field indicating the selected modulation and a $K_5$-bit field indicating the label bits allocated to that UE. Here, $K_4=\lceil \log_2 L \rceil$, $K_5=\max_{l=1,\ldots,L}(m_l)$ (or $K_5=\max_{l=1,\ldots,L}(m_l/2)$ when QAM modulations are used) and L is the number of available modulations. Upon receiving and correctly decoding this control information, the receiver device is implicitly made aware, from the allocation of time-frequency resources, of the number of resource elements G used for concurrent downlink transmission with other users, and explicitly signaled the selected modulation whose order is $m_l^{**}$ and the label bit-to-UE allocation for the receiver device. Therefore, this method has the advantage to enable configuring concurrent downlink transmission to multiple user devices without signaling an indication of the multiplexing matrix used at the transmitter side. A DCI of this format is sent to all the UEs multiplexed on the same indicated allocation of time-frequency resources.

Figure 16:
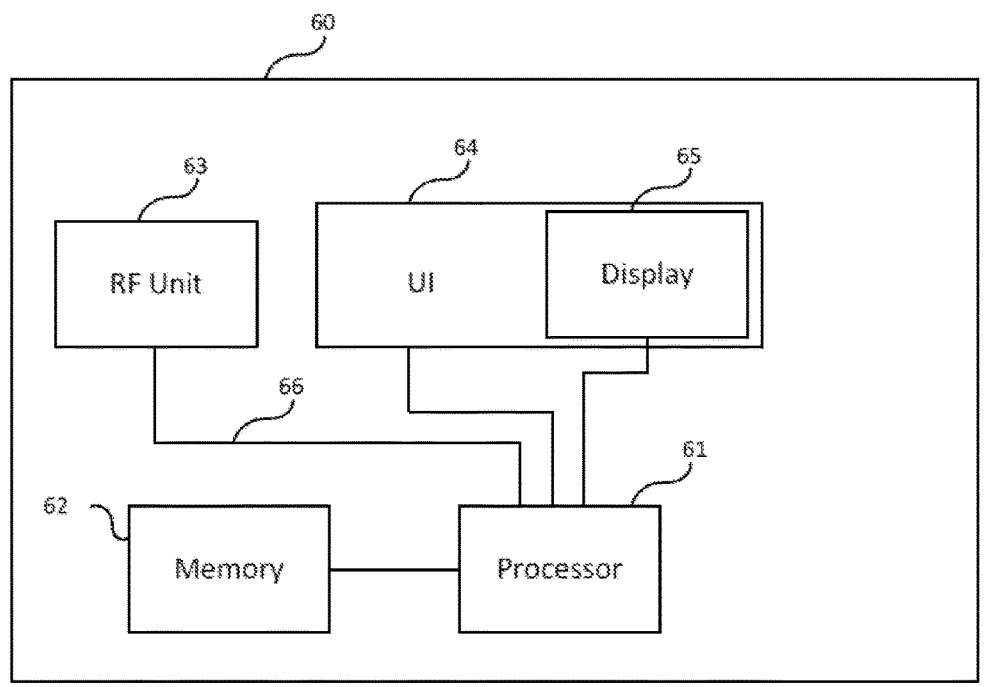
FIG. 16 illustrates one embodiment of a mobile communication device that can be used to practice aspects of the present disclosure.

Apparatus:

FIG. 16 illustrates a block diagram of an exemplary apparatus 60 incorporating aspects of the present disclosure. The apparatus 60 is appropriate for implementing the non-orthogonal multiple accesses processes described above. The illustrated apparatus 60 according to an embodiment of the disclosure includes a processor 61 coupled to a memory 62, a radio frequency (RF) unit 63, a user interface (UI) 64, and a display 65. The apparatus 60 is appropriate for use as a mobile device which may be any of various types of wireless communications user equipment such as cell phones, smart phones, or tablet devices. In one embodiment, the apparatus 60 can comprise a base station device.

The processor 61 may be a single processing device or may comprise a plurality of processing devices including special purpose devices. For example, the processor 61 may include digital signal processing (DSP) devices, microprocessors, or other specialized processing devices as well as one or more general purpose computer processors. The processor 61 is configured to perform the non-orthogonal multiple access processes described herein.

The processor 61 is coupled to a memory 62 which may be a combination of various types of volatile and/or non-volatile computer memory such as for example read only memory (ROM), random access memory (RAM), magnetic or optical disk, or other types of computer memory. The memory 62 stores computer program instructions that may be accessed and executed by the processor 61 to cause the processor 61 to perform a variety of desirable computer implemented processes or methods, including the processes described herein. The program instructions stored in memory 62 may be organized as groups or sets of program instructions referred to by those skilled in the art with various terms such as programs, software components, software modules, units, etc., where each program may be of a recognized type such as an operating system, an application, a device driver, or other conventionally recognized type of software component. Also included in the memory 62 are program data and data files which are stored and processed by the computer program instructions.

The RF Unit 63 is coupled to the processor 61 and is configured to transmit and receive RF signals based on digital data 66 exchanged with the processor 61. The RF Unit 63 is configured to transmit and receive radio signals that may conform to one or more of the wireless communication standards in use today, such as for example LTE, LTE-A, Wi-fi, as well as many others. The RF Unit 63 may receive radio signals from one or more antennas, downconvert the received RF signal, perform appropriate filtering and other signal conditioning operations, then convert the resulting baseband signal to a digital signal by sampling with an analog to digital converter. The digitized baseband signal, also referred to herein as a digital communication signal, is then sent to the processor 61.

The UI 64 may include one or more user interface elements such as a touch screen, keypad, buttons, voice command processor, as well as other elements adapted for exchanging information with a user. The UI 64 may also include a display 65 configured to display a variety of information appropriate for the apparatus 60 and may be implemented using any appropriate display type such as for example organic light emitting diodes (OLED), liquid crystal display (LCD), as well as less complex elements such as LEDs or indicator lamps, etc. In certain embodiments the display 65 incorporates a touch screen for receiving information from the user of the mobile device 60. The apparatus 60 is appropriate for implementing embodiments of the apparatus and methods disclosed herein. The processor 61 can be particularly configured to perform the methods described in the foregoing and the following.

Figure 17:
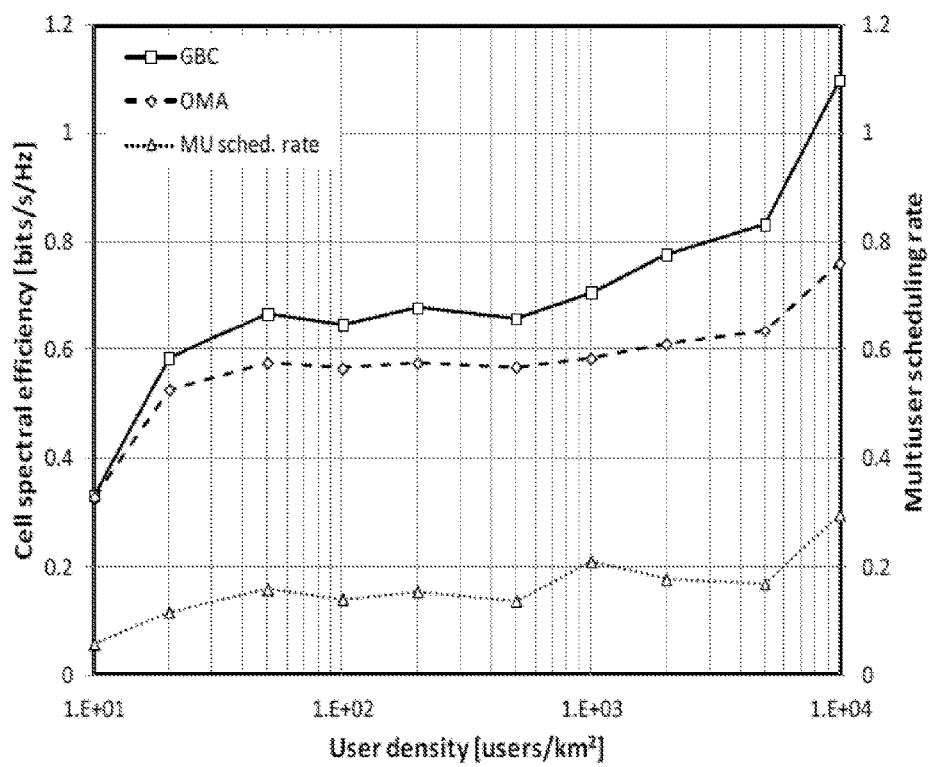
FIG. 17 illustrates the cell spectral efficiency of a communication system employing the present disclosure.

The disclosure herein disclosed results in increased downlink throughput for the wireless system in which it is employed. FIG. 17 illustrates the cell spectral efficiency of a system employing the disclosed disclosure (solid line) compared with a system performing orthogonal MA with PF scheduling (dashed line). The ratio of TTIs with multiple users over the total number of TTIs is also shown (dotted line).

As shown in FIG. 17, the down-link spectral efficiency is significantly increased when non-orthogonal transmission is used. For user densities greater than 500 users/km$^2$, the gain is between 15% and 25%. FIG. 17 also shows, on the right ordinate axis, the ratio of TTIs with multiple users over the total number of TTIs. We observe that such rate remains below 30%. Assuming that the additional signaling related to non-orthogonal transmission is to be sent only in those TTIs hosting code words of multiple receiver devices, a low multi-user scheduling rate results in a low signaling overhead. This is a clear advantage with respect to other non-orthogonal MA techniques which result in larger multiuser scheduling rates hence in larger signaling overheads.

The aspects of the disclosed embodiments provide a user selection, codeword multiplexing and constellation selection technique in a multiuser downlink cellular system associated with a weighted sum rate scheduling algorithm that achieves the maximum BICM WSR capacity of the modulation-constrained Gaussian broadcast channel. The aspects of the disclosed embodiments are applicable to all coded modulation transmission systems sending information to multiple users and using BICM, possibly combined with OFDM and MIMO transmission.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice.

What is claimed is:

1. A transmitter device, comprising:
  a processor configured to:
    determine a downlink channel quality of downlink channels between the transmitter device and a plurality of receiver devices;
    compute a scheduler weight for each of the plurality of receiver devices;
    for each modulation of a set of modulations, determine weighted bit-level capacities of all label bits based on the scheduler weights and based on the downlink channel qualities;
    determine, for each modulation of the set of modulations, a highest weighted sum rate based on the weighted bit-level capacities;
    select a modulation from the set of modulations according to a maximum weighted sum rate among the highest weighted sum rates, select a set of receiver devices from the plurality of receiver devices according to the selected modulation, and select a label bit-to-user equipment (bit-to-UE) allocation for receiver devices in the selected set of receiver devices according to the selected modulation, wherein all label bits having the same weighted bit-level capacity are allocated to a same receiver device in the selected set of receiver devices;

obtain a multiplexing matrix using the selected label bit-to-UE allocation and a number of resource elements, which are for transmitting a downlink signal S;

compute a code rate using the selected label bit-to-UE allocation and the determined bit-level capacity for each receiver device in the selected set; and transmit, using the resource elements, the downlink signal S based on the obtained multiplexing matrix and computed code rates, to the receiver devices in the selected set.

2. The transmitter device according to claim 1, wherein the processor is further configured to determine weighted bit-level capacities of all label bits for each modulation based on the determined channel quality of the downlink channels between the transmitter and the plurality of receiver devices by using a channel quality information (CQI) to bit level capacity table stored in a memory.

3. The transmitter device according to claim 1, wherein the processor is further configured to:

receive the downlink channel qualities for the plurality of receiver devices; or estimate the downlink channel qualities by measuring corresponding uplink channels for the plurality of receiver devices.

4. The transmitter device of claim 3, wherein the downlink channel qualities are based one or more of a signal-to-noise ratio or a signal-to-interference plus noise ratio.

5. The transmitter device according to claim 1, wherein the processor is further configured to:

encode, for the receiver devices in the selected set of receiver devices, an information word to obtain a code word;

use the obtained multiplexing matrix to multiplex the code words into a label vector of G elements l=(l(1), . . . , l(G)) according to the selected label bit-to-UE allocation; and use each label of the label vector l=(l(1), . . . , l(G)) to select a modulation symbol from the selected modulation to obtain a symbol vector x=(x(1), . . . , x(G)) for the multiplexed code words;

wherein the downlink signal S comprises the symbol vector x=(x(1), . . . , x(G)).

6. The transmitter device according to claim 1, wherein the processor is further configured to signal to the receiver devices in the selected set of receiver devices an index of the multiplexing matrix stored in a pre-computed library of multiplexing matrices.

7. The transmitter device according to claim 1, wherein the multiplexing matrix is associated with at least two receiver devices from the selected set of receiver devices.

8. The transmitter device according to claim 1, wherein the processor is further configured to transmit the downlink signal S with at least G number of time-frequency resource elements (RE).

9. The transmitter device according to claim 1, wherein the processor is further configured to transmit to the receiver devices in the selected set of receiver devices a downlink control information comprising at least one of:

a field indicating time-frequency resource allocation common to all receiver devices in the selected set;

a field indicating a receiver device-specific code rate;

a field indicating a selected multiplexing matrix common to all receiver devices in the selected set; or a field indicating a value in the selected multiplexing matrix to which a current receiver device from the selected set corresponds.

10. The transmitter device according to claim 1, wherein the processor is further configured to transmit to the receiver devices in the selected set a downlink control information comprising at least one of:

a field indicating a time-frequency resource allocation common to all receiver devices in the selected set;

a field indicating a receiver device-specific code rate;

a field indicating a selected modulation common to all receiver devices in the selected set; or a field indicating a receiver device-specific allocation of label bits.

11. A signaling method for concurrent transmission of non-orthogonal independent downlink data streams to receiver devices in a wireless communication system, the method comprising:

determining, by a transmitter device, a downlink channel quality of downlink channels between the transmitter device and a plurality of receiver devices;

computing, by the transmitter device, a scheduler weight for each of the plurality of receiver devices;

for each modulation of a set of modulations, determining, by the transmitter device, weighted bit-level capacities of all label bits based on the scheduler weights and based on the downlink channel qualities;

determining, for each modulation of the set of modulations, by the transmitter device, a highest weighted sum rate based on the weighted bit-level capacities;

selecting, by the transmitter device, a modulation from the set of modulations according to a maximum weighted sum rate among the highest weighted sum rates, select a set of receiver devices from the plurality of receiver devices according to the selected modulation, and select a label bit-to-user equipment (bit-to-UE) allocation for receiver devices in the selected set of receiver devices according to the selected modulation wherein all label bits having the same weighted bit-level capacity are allocated to a same receiver device in the selected set of receiver devices;

obtaining, by the transmitter device, a multiplexing matrix using the selected label bit-to-UE allocation and a number of resource elements, which are for transmitting a downlink signal S;

computing, by the transmitter device, a code rate using the selected label bit-to-UE allocation and the determined bit-level capacity for each receiver device in the selected set;

transmitting, by the transmitter device, using the resource elements, the downlink signal S based on the obtained multiplexing matrix and computed code rates, to the receiver devices in the selected set; and sending, by the transmitter device, to the receiver devices control information comprising one or more of:

identities of the receiver devices selected for transmission;

code rates of the selected receiver devices;

a label bit-to-receiver device allocation for the selected receiver devices;

an index of an expanded constellation; or the number of resource elements used for downlink transmission.

12. The signaling method of claim 11, wherein the control information comprises:

a field indicating a time-frequency resource allocation common to all selected receiver devices;

a field indicating a receiver device-specific code rate;
a field indicating a selected multiplexing matrix common to all selected receiver devices; and
a field indicating a value in the selected multiplexing matrix to which a current receiver device from the selected receiver devices corresponds.

13. The signaling method of claim 11, wherein the control information comprises:
a field indicating time-frequency resource allocation common to all selected receiver devices;
a field indicating a receiver device-specific code rate;
a field indicating a modulation common to all selected receiver devices; and
a field indicating a receiver device-specific allocation of label bits.

14. A transmitter device, comprising:
a processor configured to:
determine a downlink channel quality of downlink channels between the transmitter device and a plurality of receiver devices;
compute a scheduler weight for each of the plurality of receiver devices;
for each modulation of a set of modulations, determine weighted bit-level capacities of all label bits based on the scheduler weights and based on the downlink channel qualities;
determine, for each modulation of the set of modulations, a highest weighted sum rate based on the weighted bit-level capacities;
select a modulation from the set of modulations according to a maximum weighted sum rate among the highest weighted sum rates, select a set of receiver devices from the plurality of receiver devices according to the selected modulation, and select a label bit-to-user equipment (bit-to-UE) allocation for receiver devices in the selected set of receiver devices according to the selected modulation;
obtain a multiplexing matrix using the selected label bit-to-UE allocation and a number of resource elements, which are for transmitting a downlink signal S;
compute a code rate using the selected label bit-to-UE allocation and the determined bit-level capacity for each receiver device in the selected set; and
transmit, using the resource elements, the downlink signal S based on the obtained multiplexing matrix and computed code rates, to the receiver devices in the selected set;
encode, for the receiver devices in the selected set of receiver devices, an information word to obtain a code word;
use the obtained multiplexing matrix to multiplex the code words into a label vector of G elements $l=(l(1), \ldots, l(G))$ according to the selected label bit-to-UE allocation; and
use each label of the label vector $l=(l(1), \ldots, l(G))$ to select a modulation symbol from the selected modulation to obtain a symbol vector $x=(x(1), \ldots, x(G))$ for the multiplexed code words;
wherein the downlink signal S comprises the symbol vector $x=(x(1), \ldots, x(G))$.

* * * * *